US011053031B2

(12) United States Patent
Liu et al.

(10) Patent No.: US 11,053,031 B2
(45) Date of Patent: Jul. 6, 2021

(54) SPACECRAFT DOCKING SYSTEM AND METHOD

(71) Applicant: AEROSPACE SYSTEM ENGINEERING SHANGHAI, Shanghai (CN)

(72) Inventors: Zhi Liu, Shanghai (CN); Chongfeng Zhang, Shanghai (CN); Zongxiang Jin, Shanghai (CN); Junwei Shi, Shanghai (CN); Zhe Xie, Shanghai (CN); Xueping Hu, Shanghai (CN)

(73) Assignee: AEROSPACE SYSTEM ENGINEERING SHANGHAI, Shanghai (CN)

( * ) Notice: Subject to any disclaimer, the term of this patent is extended or adjusted under 35 U.S.C. 154(b) by 374 days.

(21) Appl. No.: 16/319,774

(22) PCT Filed: Jun. 13, 2017

(86) PCT No.: PCT/CN2017/087996
§ 371 (c)(1),
(2) Date: Jan. 22, 2019

(87) PCT Pub. No.: WO2018/014676
PCT Pub. Date: Jan. 25, 2018

(65) Prior Publication Data
US 2020/0102102 A1    Apr. 2, 2020

(30) Foreign Application Priority Data
Jul. 22, 2016 (CN) .......................... 201610583591.9

(51) Int. Cl.
*B64G 1/64* (2006.01)
(52) U.S. Cl.
CPC .................................. *B64G 1/646* (2013.01)

(58) Field of Classification Search
CPC .................................. B64G 1/646; B64G 1/64
See application file for complete search history.

(56) References Cited

U.S. PATENT DOCUMENTS 3,910,533 A * 10/1975 Cheatham .............. B64G 1/646
244/172.4
4,391,423 A * 7/1983 Pruett .................... B64G 1/646
244/115
(Continued)

FOREIGN PATENT DOCUMENTS

CN    102152860 A    8/2011
CN    102923318 A    2/2013
(Continued)

OTHER PUBLICATIONS

Zhao, Dynamic Characteristic on Differential Cushion Damping and and Transmission System of Space Docking Mechanism. Chinese Journal of Space Science, Feb. 19, 1999, 8 pages.

*Primary Examiner* — Richard R. Green
*Assistant Examiner* — Madison Elizabeth Dittner
(74) *Attorney, Agent, or Firm* — Muncy, Geissler, Olds & Lowe, P.C.

(57) ABSTRACT

A spacecraft docking system and method thereof are provided. The system comprises an active docking device and a passive docking device. The active docking device comprises an active docking ring and a docking frame. The active docking device further comprises three sets of buffer mechanisms, each set of the buffer mechanisms comprises a main buffer, two screw nut assemblies, and a self-difference buffer. An upper end and a lower end of the screw nut assembly are movably connected to the active docking ring and the docking frame, respectively. The two screw nut assemblies in each set are simultaneously driven and stretched by the main buffer, being also connected to each other through the self-difference buffer, and able to be
(Continued)

relatively adjusted and stretched through the self-difference buffer.

13 Claims, 9 Drawing Sheets

(56) References Cited

U.S. PATENT DOCUMENTS

| | | | |
|---|---|---|---|
| 4,858,857 | A | 8/1989 | Lange et al. |
| 5,040,749 | A | 8/1991 | Johnson |
| 5,094,410 | A * | 3/1992 | Johnson ............... B64G 1/646 244/172.4 |
| 6,354,540 | B1 | 3/2002 | Lewis et al. |
| 7,172,385 | B2 * | 2/2007 | Khajepour ........... B25J 17/0266 414/735 |
| 7,543,779 | B1 | 6/2009 | Lewis et al. |
| 9,302,793 | B2 * | 4/2016 | Ghofranian ............ B64G 1/646 |

FOREIGN PATENT DOCUMENTS

| | | |
|---|---|---|
| CN | 105460239 A | 4/2016 |
| CN | 105711859 A | 6/2016 |
| CN | 106240849 A | 12/2016 |
| JP | 03045500 A * | 2/1991 ............. B64G 1/646 |

* cited by examiner

SPACECRAFT DOCKING SYSTEM AND METHOD

BACKGROUND OF THE INVENTION

Field of the Invention

The present invention relates to an aerospace field, and more particularly to a spacecraft docking system and method thereof.

Description of the Prior Art

The space docking system allows two spacecrafts to be combined in a space orbit, formed in an ensemble in structure, and able to be widely used in space stations, space laboratories, space communications, remote sensing platforms and other large-scale facilities in the field of rail assembly, recycling, replenishment, maintenance and space rescue. For example, the Shenzhou-10 spacecraft and the Tiangong-1 can be rigidly connected through a docking system, so the astronaut can enter an experimental cabin of the Tiangong-1 from the Shenzhou spacecraft through a docking channel.

Most of the docking systems are provided with a mechanical structure, which includes locks, lock hooks, and other mechanisms. In general, there are two ways to connect the two spacecrafts: docking or berthing. The docking operation occurs when the chasing spacecraft (such as the Shenzhou spacecraft) enters a capture envelope range under the autonomous maneuver control and contacts the target spacecraft docking system (such as the Tiangong-1). The berthing operation occurs when an external connection device (such as a remote system, i.e. RMS) installed on a spacecraft (such as a space station) is connected to another spacecraft (such as a Japanese cargo transport vehicle), being manipulated into the capture range and make contact with the space station docking system. Both the docking and berthing operations require a docking device in both of the spacecraft so as to connect the two docking devices.

The following descriptions illustrate the main states in any of the docking processes. At first, it is a getting-closer state. The chasing spacecraft moves to a range of initial contact conditions for docking. The initial contact conditions for docking are defined as a predefined area surrounding the docking device. Before the docking and berthing operations, the spacecraft must be guided into such area. Secondly, it is a guiding alignment state. Docking rings of the two spacecrafts are guided and aligned. The two spacecrafts are drived close to each other. In the docking operations, the docking rings are forced to achieve alignment passively. Alternatively, a RMS visual warning calibration bias can be utilized for realigning. Thirdly, it is a capture state, in which a flexible connection is implemented through the neighboring two spacecrafts being locked together through a capturing device, such as capture locks. Fourthly, it is a buffer state. The relative motion energy and residual relative motion between the two spacecrafts are absorbed and consumed by the docking system. Fifthly, it is a pulling-closer state. The two spacecrafts are pulled closer to each other by an active docking device. And, a precise alignment is accomplished through a guiding pin mounted on an upper surface of a docking frame. At final, it is a rigid connection state. When the docking frames of the two spacecrafts are in the close position, the structural latch works, completes the rigid connection, and provides rigid connection force and sealing force for the two docking surfaces, whereby finishing sealing of the docking channel.

The Chinese Shenzhou spacecraft docking system is a kind of electromechanical differential docking system, which adopts a moving part of the motor drive mechanism, and the absorption of the impact energy relies on a variety of buffers in forms of spring and electromagnetic types. The docking system can be passively adapted to consume collision buffer energies in all directions according to the actual magnitude of the kinetic energy in different displacement directions. However, such a docking system is extremely complicated. While regarding a differential device, there are already more than three hundreds transmission gears, resulting in an enormously large number of components in a transmission chain. As such, the inertia of the system increases and the buffering efficiency is reduced. At the same time, the weight and manufacturing cost are also greatly increased. NASA proposed a docking system based on closed-loop force feedback control. A digital control device is used for closed-loop control. Under such circumstances, the extension, tension, correction and absorption of the impact energy of the capture ring rely on the control device and the ball wire screws, servo motors, photoelectric encoders, force and torque sensors and can be automatically completed. However, such a system adopts a high-precision force sensor, in which its real-time demands for the control device are highly complicated. In addition, the drift of the force sensor may be turned against the docking process, even causing oscillations during the buffer process.

SUMMARY OF THE INVENTION

In order to overcome the above mentioned disadvantages, the present invention is provided for a spacecraft docking system comprising an active docking device and a passive docking device. The active docking device comprises an active docking ring and a docking frame. The active docking device further comprises three sets of buffer mechanisms, each set of the buffer mechanisms comprises a main buffer, two screw nut assemblies, and a self-difference buffer, an upper end and a lower end of the screw nut assembly are movably connected to the active docking ring and the docking frame, respectively.

The two screw nut assemblies in each set are simultaneously driven and stretched by the main buffer, the two screw nut assemblies are also connected to each other through the self-difference buffer, and the two screw nut assemblies are able to be relatively adjusted and stretched through the self-difference buffer.

In an alternative embodiment of the present invention, the lower ends of the six screw nut assemblies are distributed uniformly along the docking frame, the screw nut assemblies are connected to the active docking ring through the self-difference buffer, and the three self-difference buffers are distributed uniformly along the active docking ring at its periphery.

In an alternative embodiment of the present invention, the main buffer comprises a main buffer motor and main buffer transmission components, the two screw nut assemblies in each set are driven by the corresponding one main buffer motor through the main buffer transmission components.

In an alternative embodiment of the present invention, the main buffer further comprises an angle encoder which is configured to detect an angle of rotational motion output by the main buffer transmission components or the main buffer motor.

In an alternative embodiment of the present invention, the self-difference buffer comprises two gears and an idle gear, each gear is connected to one of the screw nut assemblies, the two gears are associated with the same idle gear, and the idle gear is further controlled by a self-difference drive structure.

In one embodiment, the self-difference drive structure comprises a self-difference buffer motor, and/or a spring structure, and/or a damper, and/or a clutch.

In one embodiment, the self-difference drive structure is connected to the associated idle gear through an acceleration or deceleration device.

In an alternative embodiment of the present invention, each set of the buffer mechanisms further comprises a main clutch, the main buffer drives the screw nut assemblies to extend and contract only when the main clutch does not skid, the main clutch is configured to have a clutch torque before capturing, which is smaller than the clutch torque after the capturing is complete, and the main clutch will skid when its clutch torque is exceeded.

In an alternative embodiment of the present invention, each set of the buffer mechanisms further comprises an auxiliary buffer clutch, the self-difference buffer drives the screw nut assemblies to relatively extend and contract only when the auxiliary buffer clutch skids, the auxiliary buffer clutch is configured to have a clutch torque before capturing, which is smaller than the clutch torque after the capturing is complete, and the auxiliary buffer clutch will skid when its clutch torque is exceeded.

In an alternative embodiment of the present invention, the clutch torque of the main clutch and the auxiliary buffer clutch is configured to be related to the supplied voltage to the main clutch and the auxiliary buffer clutch.

In an alternative embodiment of the present invention, each set of the buffer mechanisms further comprises a screw displacement sensor for detecting expansion and contraction displacement of the screw nut assemblies, and/or a screw self-difference sensor for detecting a difference between the expansion and contraction displacements of the two screw nut assemblies in the same set, wherein the main buffer and the self-difference buffer are controlled according to data detected by the screw displacement sensor and/or the screw self-difference sensor, thereby meeting movement needs in a docking process.

In an alternative embodiment of the present invention, the main buffer is performed for controlling expansion and contraction movement of the screw nut assemblies through a rotary motion, the self-difference buffer is performed for adjusting the relative expansion and contraction movements of the two screw nut assemblies through the rotary motion, and a rotary encoder, a potentiometer or an angle encoder is employed for implementing the screw displacement sensor and/or the screw self-difference sensor.

In an alternative embodiment of the present invention, the screw nut assembly comprises a screw, a nut and a transmission gear set, the nut is driven to rotate by the main buffer through the transmission gear set, the screw is matched with the nut, the adjustable expansion and contraction is performed due to the rotation of the nut, the screw is connected to the active docking ring, and the two screws in the same set are performed for adjusting their relative expansion and contraction adjustment by the self-difference buffer.

The spacecraft docking system further comprises a control device, the main buffer is performed for controlling expansion and contraction movement of the screw nut assemblies through a rotary motion, the self-difference buffer is performed for adjusting the relative expansion and contraction movements of the two screw nut assemblies through the rotary motion, and a rotary encoder is employed for implementing the screw displacement sensor and/or the screw self-difference sensor.

The spacecraft docking system further comprises a control device, wherein the control device controls the main buffer and the self-difference buffer according to the detected expansion and contraction state of the screw nut assemblies to meet motion requirements of a docking process.

The present invention further provides a spacecraft docking method which adopts the spacecraft docking system according to the alternative embodiments of the present invention, comprising the following steps:

S1: the main buffer and/or the self-difference buffer are adjusted to a capture mode, and the six screw nut assemblies are driven out by the three main buffers such that the active docking ring is pushed out;

S2: after the active docking ring is in contact with the passive docking device, the active docking ring is deflected under the interaction force, and the screw nut assemblies are driven and pushed out by the main buffer according to the expansion and contraction data of the screw nut assemblies collected from the main buffer and/or the self-difference buffer, so as to implement the corresponding guiding and aligning;

S3: the active docking ring and a passive docking ring of the passive docking device are flexibly connected through a capturing device thereon, after the flexible connection is completed, the main buffer and/or the self-different buffer are adjusted to a buffer mode, and a capture sensing device is triggered, entering step S4 or S5;

S4: according to the expansion and contraction data of the screw nut assemblies collected from the main buffer and/or the self-difference buffer, the expansion and contraction situation of the screw nut assemblies is controlled due to the main buffer and/or the self-difference buffer so as to achieve its desired situation, wherein the expansion and contraction situation of the two screw nut assemblies in the same set is identical; then, entering step S6;

S5: the two screw nut assemblies are pushed out to a limit position, thereby completing a forced correction of the docking ring; then, entering step S6;

S6: the active docking device and the passive docking device are pulled closer to achieve accurate alignment;

S7: a rigid connection and sealing are completed.

wherein, a driving capability of the main buffer and the self-difference buffer under the buffer mode is greater than the driving capability of the main buffer and the self-difference buffer under the capture mode.

In an alternative embodiment of the present invention, each set of the buffer mechanisms further comprises a main clutch and an auxiliary buffer clutch, the main buffer drives the screw nut assemblies to extend and contract only when the main clutch does not skid, the self-difference buffer drives the screw nut assemblies to relatively extend and contract only when the auxiliary buffer clutch skids.

According to the docking system and method provided by the present invention, by introducing group control and the self-different buffer, no force sensors are needed to participate for controlling. In addition, the Stewart platform positive solution operations are prevented and the instant feedback control in the control system is achieved.

By employing the present invention, it is advantageous of not only effectively buffering the collision load during the docking process, but also realizing the docking and undocking with different docking quality targets by changing the clutch torque of the clutch in orbit as well as the running speed of the motor driving device. In addition, a further docking with the existing manned spacecraft is accomplished. A utility model of the present invention is simple, and thus having the advantages of work reliability, light weight, wide economy and universality.

In the patent ZL201210489374.5, a docking system for allogeneic isomorphism and stiffness damping closed-loop feedback control is disclosed. It employs a linear drive mechanism having reversible transmission, and realizes buffering damping force through the six-linear-drive-devices motor according to a preset control law. The system is not involved with any high-precision force sensors built in, so the system complexity is lowered. However, the system needs to perform the Stewart platform positive solution operations, and thus the required calculations are huge. Also, the independent driving of the six linear drive devices has the disadvantages such as small capture angles and so on.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
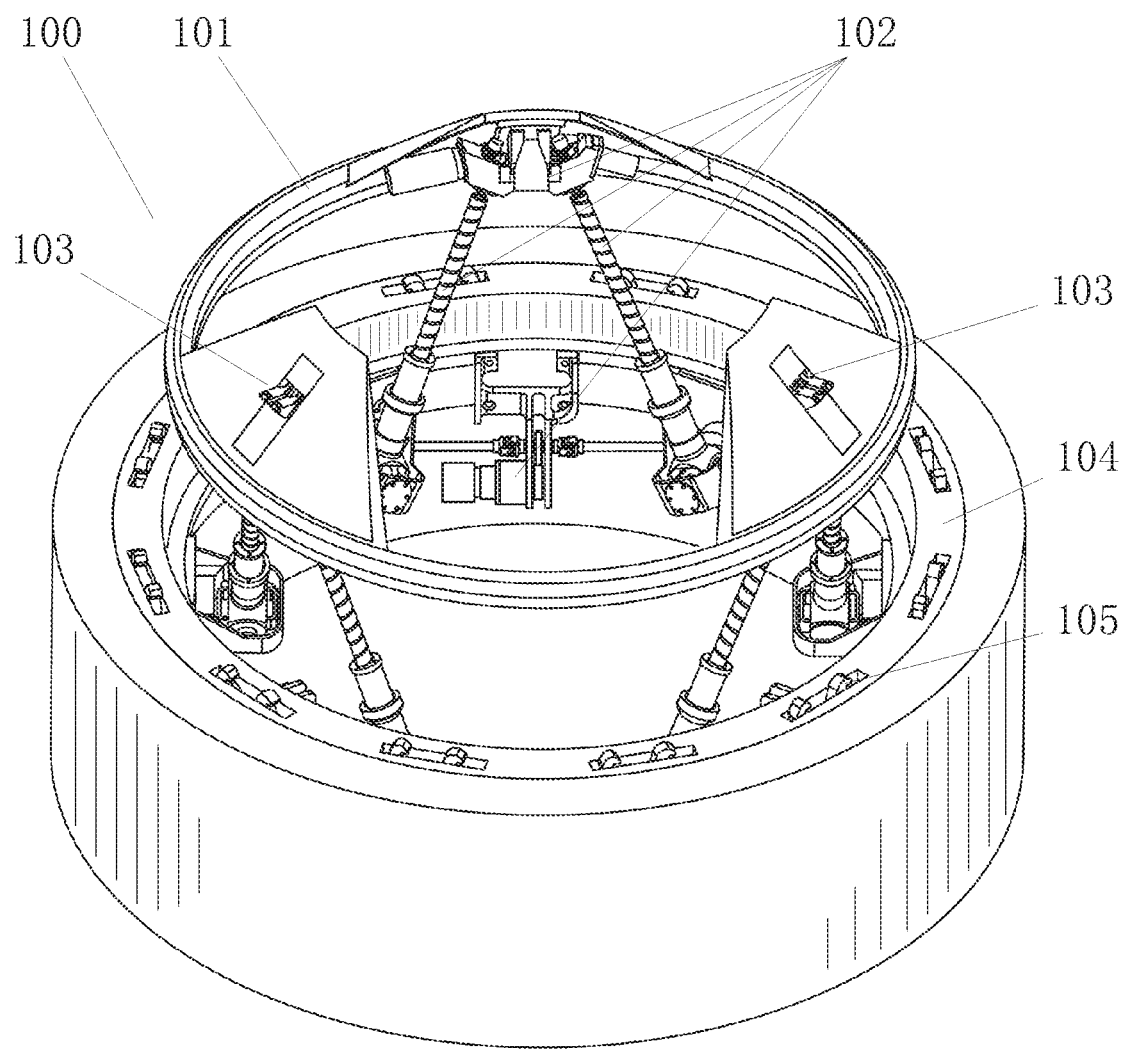
FIG. 1 shows a schematic view of an active docking device according to one embodiment of the present invention.
Figure 2:
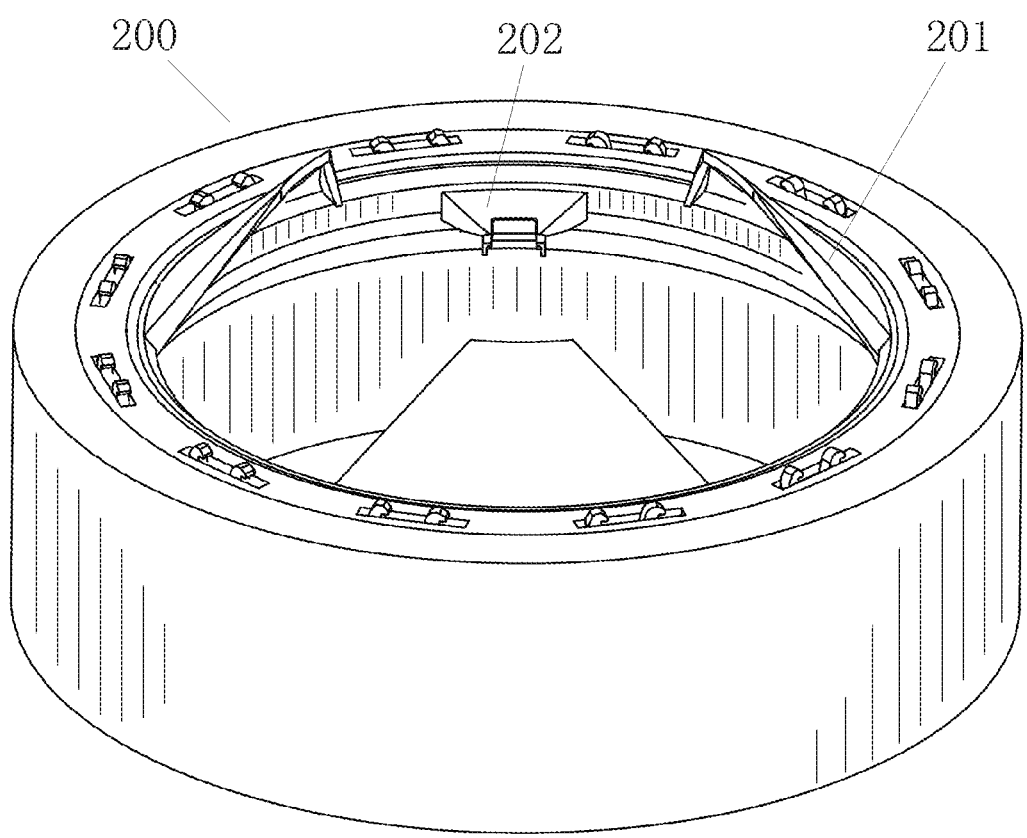
FIG. 2 shows a schematic view of a passive docking device according to one embodiment of the present invention.
Figure 3:
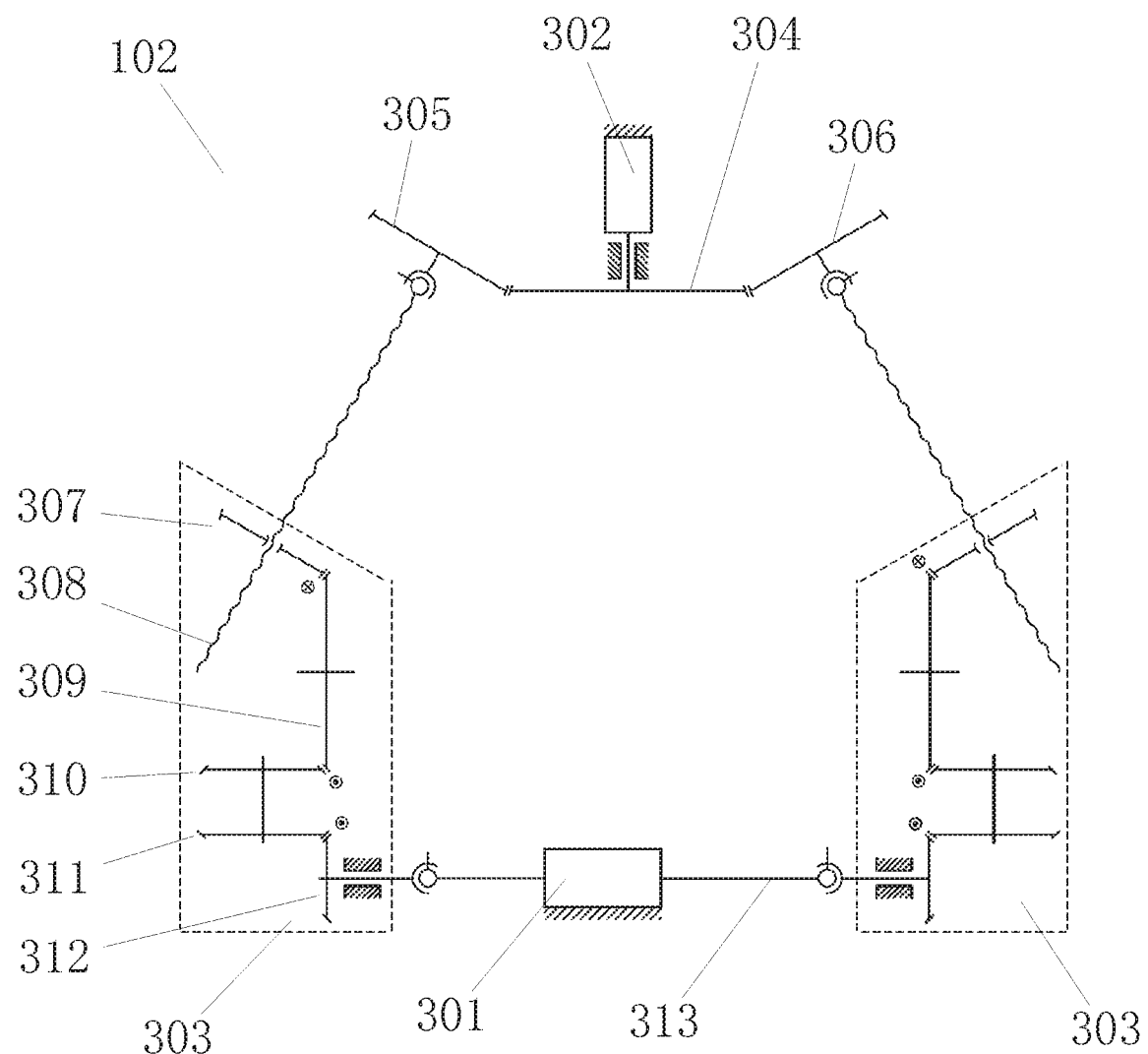
FIG. 3 shows a functional diagram of a buffer mechanism according to one embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

Please refer to FIG. 1 to FIG. 12, which represent embodiments of the present invention. The spacecraft docking system and method provided by the present invention will be described in detail below with references to FIG. 1 to FIG. 12. And, the embodiments described below are illustrated to demonstrate the technical contents and characteristics of the present invention and to enable the persons skilled in the art to understand, make, and use the present invention. However, it shall be noticed that, it is not intended to limit the scope of the present invention. Therefore, any equivalent modification or variation according to the spirit of the present invention is to be also included within the scope of the present invention.

Embodiment 1

Please refer to FIG. 1 to FIG. 7. The present invention provides a spacecraft docking system, comprising an active docking device 100 and a passive docking device 200. The passive docking device 200 is disposed on a target spacecraft, and components of the passive docking device 200 are simplified on the basis of the active docking device, thus merely retaining docking rings, rigid connecting devices, control device and so on.

The active docking device 100 comprises an active docking ring and a docking frame. The active docking device further comprises a plurality of capture locks 103, a structural latch system 105, and a docking frame 104. The passive docking device 200 further comprises a passive docking ring 201, a pallet 202, and so on.

The active docking ring 101 comprises a plurality of lobes, and the capture lock 103 is disposed on each lobe of the active docking ring 101. The capture lock 103 is able to be engaged with the pallet 202 of the passive docking device 200 on the opposite for capturing. Also, an electromagnetic capture mechanism is able to be employed.

According to the embodiment of the present invention, the active docking device 100 further comprises three sets of buffer mechanisms, and each set of the buffer mechanisms 102 comprises a main buffer, two screw nut assemblies 303, and a self-difference buffer. An upper end and a lower end of the screw nut assembly 303 are movably connected to the active docking ring 101 and the docking frame 104, respectively.

The two screw nut assemblies 303 in each set are simultaneously driven and stretched by one main buffer. The two screw nut assemblies 303 are also connected to each other through the self-difference buffer. As a result, the two screw nut assemblies 303 are able to be relatively adjusted and stretched through the self-difference buffer.

In an alternative embodiment of the present invention, numbers of the lobe structure of the active docking ring 101, the capture lock 103, the buffer mechanism 102, and the pallet 202 are three or can be four or even more. As for the active docking ring, electromagnetic capturing mechanism, structural latch system, and so on, since they have been fully described in Patent number ZL201210489374.5, they are not explained here again. References can be made and understood with respect to the patent.

In a preferred embodiment of the present invention, please refer to FIG. 1, lower ends of the six screw nut assemblies 303 are distributed uniformly along the docking frame 104, the screw nut assemblies 303 are connected to the active docking ring 101 through the self-difference buffer, and the three self-difference buffers are distributed uniformly along the active docking ring 101 at its periphery.

The main buffer motor 301 and the screw nut assembly 303 are disposed on an inner flange of the docking frame 104 via a support structure. The self-difference buffer motor 302 is disposed on the docking ring 101 via a support structure. Thus, the docking ring 101 and the docking frame 104 are structurally connected by six screws 318 so as to form a 6-degree-of-freedom Stewart platform.

Regarding the Main Buffer

In one embodiment of the present invention, the main buffer comprises a main buffer motor 301 and main buffer transmission components. The two screw nut assemblies 303 in each set are driven by the corresponding main buffer motor 301 through the main buffer transmission components. The main buffer transmission components mainly comprise a main buffer shaft 313; in a further alternative embodiment of the present invention, the rotor output shaft of the main buffer motor 301 is coaxial and directly connected to the main buffer shaft 313. For better reliability and buffering capability, the main buffer motors 301 can also be used in series optionally.

The main buffer further comprises an angle encoder which is configured to detect an angle of rotational motion output by the main buffer transmission components or main buffer motor 301. The angle encoder can be used to measure the angle of the main buffer shaft 313 in rotation. A separate angle measuring sensor can also be used by disposing certain transmission links so as to transmit the rotational motion of the main buffer shaft 313 to the angle measuring sensor. The angle measuring sensor can be chosen from, but is not limited to, an angle encoder, a resolver, a potentiometer, etc., under the situation when satisfying the required measurement accuracy.

In addition, the main buffer motor 301 should have a brake lock function without increasing power consumption, which assures a holding function of the docking ring 101 in the retracted state. In other alternative embodiments of the present invention, when the main buffer motor 301 does not have such a locking function, a brake device can also be disposed on the main buffer shaft 313, and the brake device can be implemented in a common mechanism. As such, after the main buffer motor 301 is powered, the brake device unlocks the degree of freedom of rotation of the main buffer shaft 313.

Regarding the Self-Difference Buffer

In one embodiment of the present invention, the self-difference buffer comprises two gears 305, 306 and an idle gear 304. Each gear 305 or 306 is connected to a screw nut assembly 303, and the two gears are associated with the same idle gear 304. The idle gear 304 can also be controlled by a self-difference drive structure.

In a further alternative embodiment of the present invention, the self-difference drive structure comprises a self-difference buffer motor, and/or a spring structure, and/or a damper, and/or a clutch. The self-difference drive structure is connected to the associated idle gear through an acceleration or deceleration device.

When adopting a self-difference buffer motor, the self-difference buffer motor 302 is connected to the idle gear 304. The gear 304 is meshed with the gears 305 and 306, respectively, and the three can be rotated simultaneously. In the embodiment of the present invention, the self-difference buffer motor 302 is connected to the associated idle gear 304. Alternatively, the self-difference buffer motor 302 may be connected to the gear 305 or the gear 306, or an acceleration or deceleration device may be added between the motor 302 and the gear 305 or the gear 306, or a plurality of motors may be selectively connected to the above mentioned gear. By using the self-difference buffer motor 302, the idle gear 304 can be controlled to rotate correspondingly according to the required amount of relative expansion and contraction. The interior of the self-difference buffer motor 302 comprises an angle encoder that can be used to measure the angle of rotation of the idle gear 304. Alternatively, a separate angle measuring sensor can also be used by disposing certain transmission links so as to transmit the rotational motion of the main buffer shaft 313 or the idle gear 304 to the angle measuring sensor. The angle measuring sensor can be chosen from, but is not limited to, an angle encoder, a resolver, a potentiometer, etc., under the situation when satisfying the required measurement accuracy.

The self-difference buffer motor 302 is used for self-difference buffering and correcting the same set of screws, and is independent of the push-out and pull-back of the docking ring 101. Therefore, the self-difference buffer motor can also be replaced by a combination of a spring mechanism and a damper, or either one of the two. When the motor is only replaced by using the damper mechanism, the length of the screws in a same set cannot automatically achieve equal length correction. The main buffer motor 301 is required to push the active docking ring 101 to the limit position, forcing the six screws to be equal in length to correct the docking ring. Dampers, clutches, and the like are also exemplified, but are not limited to electromagnetic clutch mechanisms, magnetorheological dampers, hysteresis clutches, or electromechanical control devices.

In view of the above-mentioned rotary encoder, it can be considered that, according to the embodiments of the present invention, each set of the buffer mechanisms further comprises a screw displacement sensor for detecting the expansion and contraction displacement of the screw nut assemblies, and/or a screw self-difference sensor for detecting the difference between the expansion and contraction displacements of the two screw nut assemblies in the same set. The main buffer and the self-difference buffer are controlled according to data detected by the screw displacement sensor and/or the screw self-difference sensor, thereby meeting the movement needs in the docking process.

Among the above-mentioned embodiments, since the main buffer is performed for controlling the expansion and contraction movement of the screw nut assemblies through a rotary motion, the self-difference buffer is able to be performed for adjusting the relative expansion and contraction movement of the two screw nut assemblies through a rotary motion. A rotary encoder is employed for implementing the screw displacement sensor and/or the screw self-difference sensor.

Regarding the Screw Nut Assembly 303

The screw nut assembly comprises a screw 308, a nut 307 and a transmission gear set. The nut 307 can be a geared nut that is driven to rotate by the main buffer through the transmission gear set. The screw 308 is matched with the nut 307, and the adjustable expansion and contraction is performed due to the rotation of the nut 307. The screw 308 is connected to the active docking ring 101, and the two screws 308 in the same set are performed for adjusting their relative expansion and contraction adjustment by the self-difference buffer. In an alternative embodiment of the invention, the screw 308 and the nut 307 belong to the conventional ball screw type. When the nut 308 rotates, the screw 307 is accordingly driven to linearly stretch out and pull back along the nut 308.

By properly designing the lead process of the screw 307, the screw 307 and the nut 308 can have brilliant motion fluency, enabling forward and reverse transmission. That is, the movement output by the rotation of the nut 308 is able to drive the expansion and contraction of the screw 307. Alternatively, an axial movement of the screw 307 can be merely applied, and thus leading the nut 308 being reversely rotated, thereby achieving the contraction between the screw 307 and the nut 308.

The two screws in the same set are respectively a left-handed screw and a right-handed screw, so that when the main buffer shaft 313 rotates, the same set of screws 307 are driven to extend or contract in the same direction through the transmission gear. Of course, the two screws in the same set can also be implemented with the same direction of rotation. In this case, the gear transmission relationship needs to be adjusted to achieve the same direction and contraction of the two screws.

Figure 4:
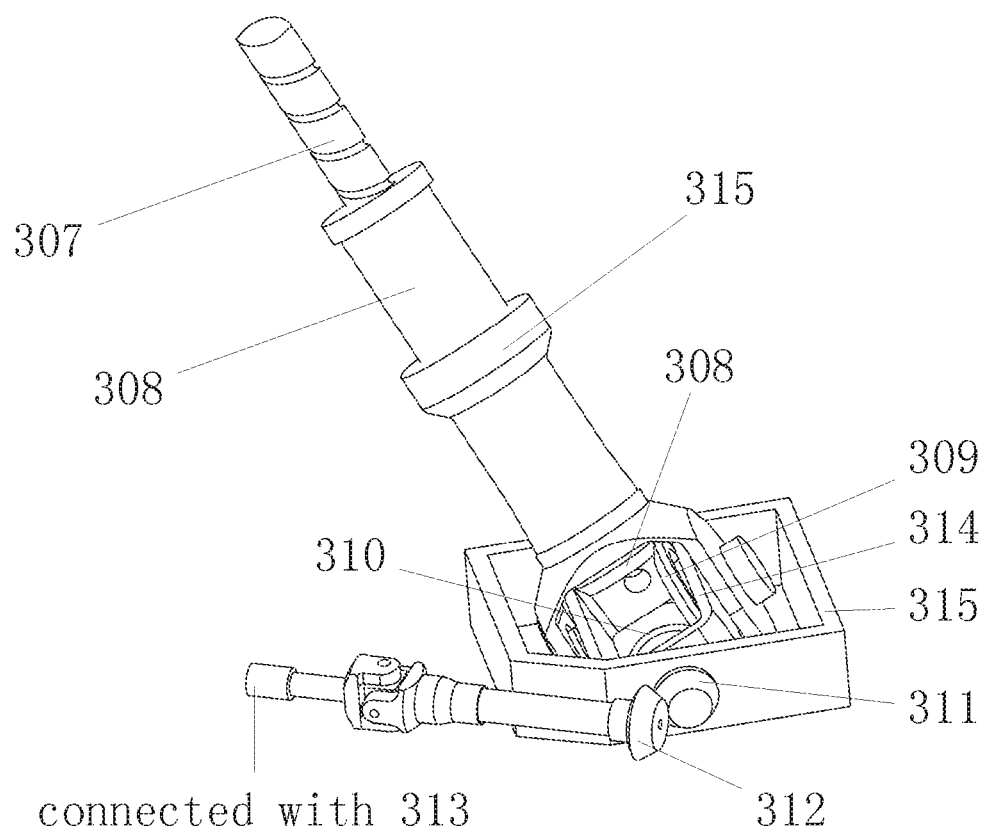
FIG. 4 shows a schematic view of a screw nut assembly according to one embodiment of the present invention.

The nut 308 is connected to the main buffer shaft 313 after being driven by the bevel gears 309~312. Through the design of the bevel gears 309~312, the screw nut assembly 303 can be rotated two-dimensionally around the bottom pivot point. FIG. 4 shows a specific structural layout embodiment of the present invention. In FIG. 4, a structural frame 315 is fixed on the docking frame 104, and the rotating frame 314 is connected to the structural frame 315 through the rotating shaft to realize one-dimensional rotation. A bevel gear 311 is fixed at one end of the rotating shaft of the frame 314. On the other end of the frame 314, the nut frame 316 and the gear 309 are connected by the same rotating shaft, and the three can be relatively rotated. Transmission of the bevel gear 309 and the nut 308 are driven via a bevel form.

The upper part of the screw 308 is connected to the gears 305, 306 by a universal joint, respectively, and the screw 308 and the gears 305 or 306 can be rotated simultaneously. Thus, there is three degrees of rotational freedom between the screw 307 and the docking ring 101. The bevel gear 312 is connected with the main buffer shaft 313 by a universal joint, and these universal joints are used for transmissions in different shafts between each transmission shaft. It is believed that, in the case of ensuring coaxiality between the transmission shafts, a coupling mechanism or the like can be adopted for transmission, too. In addition, an elastic link can be added to the upper end of the screw 307, such as a pre-tightening compression spring for buffering the axial impact load of the larger lead screw.

The buffer mechanism 102 forms a closed drive chain such that the docking ring 101 and the docking frame 104 form a 6-degree-of-freedom Stewart platform through structurally connecting the six screws 307.

The spacecraft docking system further comprises a control device, wherein the control device controls the main buffer and the self-difference buffer according to the detected expansion and contraction state of the screw nut assemblies 303 to meet the motion requirements of the docking process. Furthermore, the main buffer is performed for driving the expansion and contraction of the screw nut assembly 303 by a rotary motion, and the self-difference buffer is performed for adjusting the relative adjustments of the expansion and contraction of the two screw nut assemblies by a rotary motion.

The control device controls the main buffer and the self-difference buffer according to rotation angle data collected from the main buffer and the self-difference buffer and that related to the expansion and contraction of the screw nut assembly 303 so as to meet the movement needs of the docking process.

The Functioning Mechanism of the Control Device is Described as Follows.

The control device is connected to the main buffer motor 301 and the self-difference buffer motor 302, and the control device can be disposed on the docking frame 104 or inside the spacecraft cabin based on different application requirements.

Before docking process, the control device controls the main buffer motor 301 and the self-difference buffer motor 302 to generate a certain holding torque. After the docking ring of the two spacecrafts are in mechanical contact under the initial conditions, the control device 106 drives the main buffer motor 301 to pull out the active docking ring 101, and the active docking ring 101 of the chasing spacecraft is subjected to the docking force, such that the main buffer motor 301 and the self-difference buffer motor 302 are acted upon by the transmission of the screw and the gear. Under such action of the docking force, the main buffer motor 301 moves to decelerate or accelerate. The control device controls the maximum output torque of the main buffer motor 301 to a predetermined value by adjusting the operating current. When the resistance torque applied to the main buffer motor 301 exceeds its maximum output torque, the main buffer motor 301 may be blocked or reversely rotated (i.e, the docking force acts on the motor 301 such that the motor starts to rotate from the forward direction back to a reverse direction).

When the torque applied to the main buffer motor 301 by the docking force is in the same direction as the output power direction of the main buffer motor 301, the main buffer motor 301 shows an accelerated rotation. The control device pre-specifies the maximum speed limit of the main buffer motor 301. When the main buffer motor 301 approaches its speed limit, the control device 106 performs the deceleration of the main buffer motor 301 by reducing the current or reversing the current direction or the like. The active docking ring 101 passively generates position and attitude deviations. Under the action of the docking force, the screws 307 in the same set generates a length difference, which drives the idle gear 304 to rotate against the holding torque of the self-difference buffer motor 302. When the idle gear 304 generates rotation angles, the control device adjusts the torque and direction of the self-difference buffer motor 302 in real time. Certainly, when the self-difference buffer motor is replaced by a spring structure, a damper, or the like, adjustments can also be made by oneself without being controlled by the control device.

When the control device determines that the two spacecrafts docking rings are combined and implemented to capture, the control device changes the control law of the main buffer motor 301 and the self-difference buffer motor 302, and the control device 106 collects singles from angle encoders of the main buffer motor 301 and the self-difference buffer motor 302 so as to calculate the respective rotation angle values. According to these calculated values, the control device controls the main buffer motor 301 and the self-difference buffer motor 302 to move the screw to a pre-specified length position according to a predetermined control law, thereby realizing buffering and correcting of the docking ring.

On the other hand, the present invention further provides a spacecraft docking method, which adopts the spacecraft docking system above mentioned by the present invention, comprising the following steps:

S1: the main buffer and/or the self-difference buffer are adjusted to a capture mode, and the six screw nut assemblies 303 are driven out by the three main buffers such that the active docking ring 101 is pushed out.

When being combined with the system mentioned above, it can be further described as:

The control device supplies power to the main buffer motor 301 to implement the transmission between the main buffer motor 301 and the screw 308, such that the active docking ring 101 is pushed out to a docking position, and a control law of the main buffer motor 301 is adjusted to a capture mode, waiting for docking;

In another point of view, it can be understood that: the active docking ring 101 is unlocked, and is pushed out from a retraction state to a ready-for docking position. The control device supplies power to the motor, and drives the motor driving device to push out the screw according to a predetermined position of the docking ring. After the docking ring is in its right place, the motion is stopped. Under such circumstances, the control device adjusts the control law of the motor to the capture mode according to the characteristics of the docking target, (generally, the maximum output torque is smaller under this mode), waiting for docking;

S2: after the active docking ring is in contact with the passive docking device, the active docking ring is deflected under the interaction force. The screw nut assemblies are driven and pushed out by the main buffer and/or the self-difference buffer according to the expansion and contraction data of the screw nut assemblies collected from the main buffer and/or the self-difference buffer, so as to implement the corresponding guiding and aligning;

When being combined with the structure mentioned above, it can be further understood as:

The chasing spacecraft moves to a range of docking capture initial conditions, the active docking device and the passive docking device are in contact with each other, and the main docking ring is deflected under the interaction force. As such, the control device controls the expansion and contraction of the corresponding screw through the motor according to signals of the angle encoder of the motor. As a result, the active docking ring is performed accordingly for guiding and aligning;

It can be also described as: the chasing spacecraft moves to a range of initial contact conditions for docking, a guiding alignment state of the docking device is entered, and guiding plates of the two spacecrafts are contacted. Under such an interaction force, the docking ring of the active docking device is deflected. When the length change of the screw is detected, the control system supplies power to the motor driving device, and the docking ring is pushed out through the main buffer motor, thereby performing guiding and aligning;

S3: the active docking ring and a passive docking ring of the passive docking device are flexibly connected through a capturing device thereon; after the flexible connection is completed, the main buffer and/or the self-different buffer are adjusted to a buffer mode, and a capture sensing device is triggered, entering step S4 or S5;

In other words, the active docking ring and the passive docking ring are flexibly connected through the capturing device thereon for completing the capturing; the control system obtains the signal being captured, and then adjusts the control law of the motor to the buffer mode;

The above two steps can also be described as: a capturing process of the docking device relies on: two neighboring docking devices are flexibly connected through mechanical capture (such as the capture mode of the Shenzhou spacecraft docking mechanism) or electromagnetic capture, and then the capture sensing device on the docking ring is trigger and thus giving signals for capturing;

S4: according to the expansion and contraction data of the screw nut assemblies collected from the main buffer and/or the self-difference buffer, the expansion and contraction situation of the screw nut assemblies is controlled due to the main buffer and/or the self-difference buffer so as to achieve its desired situation, wherein the expansion and contraction situation of the two screw nut assemblies in the same set is identical; then, entering step S6;

S5: the two screw nut assemblies are pushed out to a limit position, thereby completing a forced correction of the docking ring; then, entering step S6;

When being combined with the device mentioned above, it can be further described as:

The control system is performed for the expansion and contraction of the screw through the motor according to the signal change of the angle encoder of the main buffer motor 301 and the self-different buffer motor 302, to achieve its desired situation; Alternatively, the screws can all be pushed out to the limit position, thereby completing forced correction of the docking ring;

Furthermore, it can be described as: after detecting the capture signal, the control system adjusts the motor control law to the buffer mode (the motor output torque is larger under such mode), and at the same time, the control system drives each screw to move to its predetermined position according to the collected signals from the angle encoders. During this process, motor motion of acceleration, deceleration, stalling, or reversing, etc. may occur. Through the opposite force provided by the docking ring, the relative motion energy and the remaining relative motion between the two spacecrafts are absorbed and consumed; finally, when each screw is moved to have the same length, the buffer process is finished and the docking ring is corrected.

S6: the active docking device and the passive docking device are pulled closer to achieve accurate alignment; specifically, the chasing spacecraft and the target spacecraft are pulled closer to each other so as to implement precise positioning; furthermore, the active docking device of the chasing spacecraft will pull the two spacecrafts closer to each other, and thus a precise alignment is accomplished through a guiding pin mounted on an upper surface of the docking frame;

S7: a rigid connection and sealing are completed; furthermore, when the docking frame of the two spacecrafts are in the close position, the structural latch works, completes the rigid connection, and provides rigid connection force and sealing force for the two docking surfaces, whereby finishing sealing of the docking channel.

Wherein, a driving capability of the main buffer and the self-difference buffer under the buffer mode is greater than the driving capability of the main buffer and the self-difference buffer under the capture mode.

Figure 5:
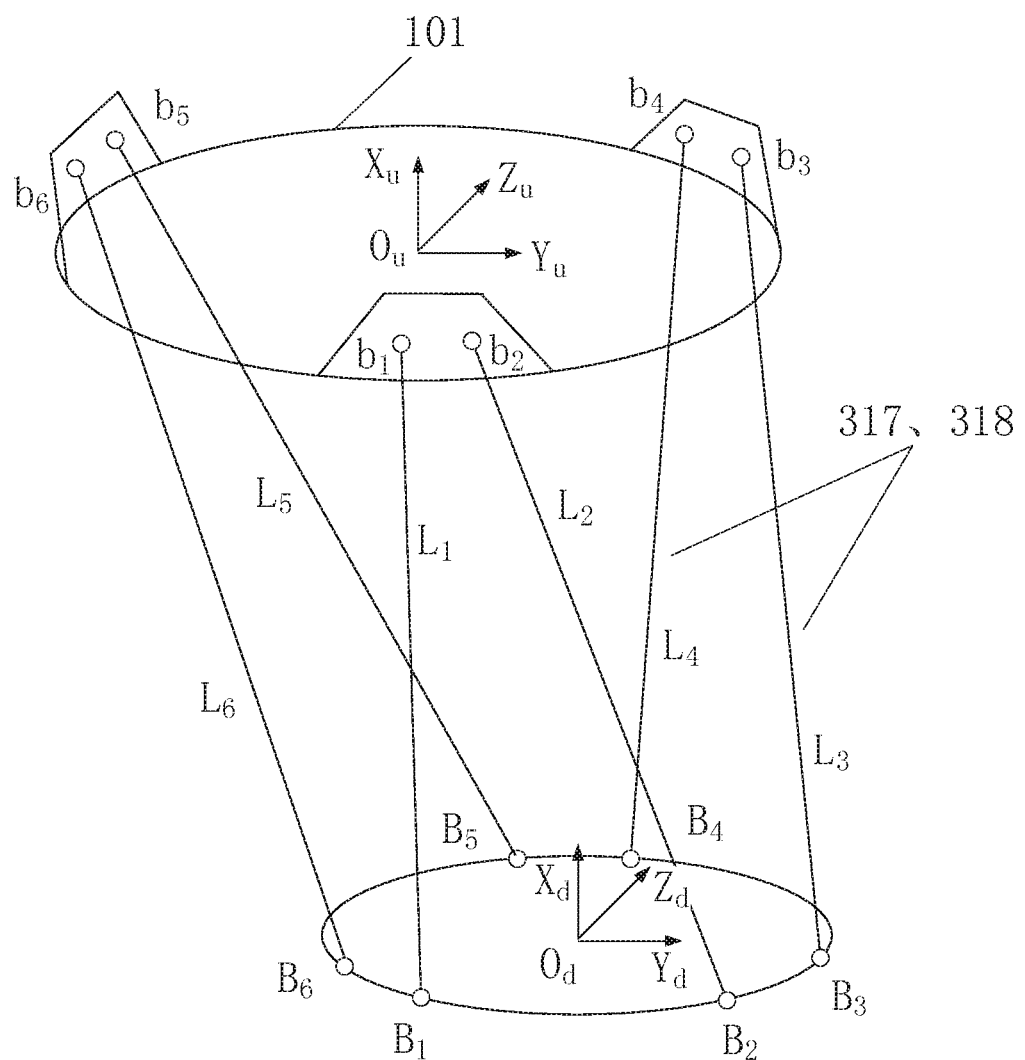
FIG. 5 shows a schematic diagram of the coordinate system of the active docking device according to one embodiment of the present invention.

FIG. 5 shows a schematic diagram of the coordinate system of the active docking mechanism. In FIG. 5, $B_1 \sim B_6$ represent lower pivot points of the Stewart platform, which are, the rotational center points of the screw 307 relative to the docking frame 104, while $b_1 \sim b_6$ represent upper pivot points on the Stewart platform, which are, the rotational center points of the screw 307 relative to the active docking ring 101. $L_1 \sim L_6$ are the distance between the upper and lower pivot points of the six screws.

In FIG. 5, $O_u$ is the center of the circle where the upper pivot points $b_1 \sim b_6$ on the screw are located, which is fixed to the docking ring 101. $O_d$ is the center of the circle where the lower pivot points $B_1$~$B_6$ on the screw are located. The transformation from the coordinate system $O_u\square X_u Y_u Z_u$ to the coordinate system $O_d\square X_d Y_d Z_d$ can be given by the Euler transform Euler ($\square$, $\square$, $\square$), wherein $\square$ is the yaw angle (around the Y axis); $\square$ is the pitch angle (around the Z axis); and $\square\square$ is the roll angle (around the X axis).

According to the transmission theoretic diagram, a linear transformation relationship between the rotation angles of the three main buffer motors 301 (i.e., the main buffer shaft 313) and the length changes in the screw $L_1$~$L_6$ is as follows:

$$[\theta_{m1} \quad \theta_{m2} \quad \theta_{m3}]^T = \underline{S_1}\delta\underline{L} \text{ wherein,}$$

$$\underline{S_1} = \frac{\pi l_r}{t_0}\Gamma_1, \Gamma_1 = \begin{bmatrix} 1 & 1 & 0 & 0 & 0 & 0 \\ 0 & 0 & 1 & 1 & 0 & 0 \\ 0 & 0 & 0 & 0 & 1 & 1 \end{bmatrix}$$

$$\delta\underline{L} = [\delta L_1 \quad \delta L_2 \quad \delta L_3 \quad \delta L_4 \quad \delta L_5 \quad \delta L_6]^T$$

$\theta_{m1}$, $\theta_{m2}$, $\theta_{m3}$ represent the rotation angles of the three main buffer motors 301 (i.e., the main buffer shaft 313) and these angles can be measured through the angle encoders of the main buffer motors 301;

$\delta L_i$ (i=1, 2, 3, ..., 6) represents the length changes of the screws;

$I_r$ represents a rotational ratio of the main buffer motor 301 to the nut 308;

$t_0$ represents a lead process of the screw 307.

In the same manners, a linear transformation relationship between the rotation angles of the self-difference buffer motors 302 and the length changes in the screw $L_1$~$L_6$ is as follows:

$$[\theta_{s1} \quad \theta_{s2} \quad \theta_{s3}]^T = \underline{S_2}\delta\underline{L} \text{ wherein,}$$

$$\underline{S_2} = \frac{\pi l_p}{t_0}\Gamma_2, \Gamma_2 = \begin{bmatrix} 1 & -1 & 0 & 0 & 0 & 0 \\ 0 & 0 & 1 & -1 & 0 & 0 \\ 0 & 0 & 0 & 0 & 1 & -1 \end{bmatrix}$$

$\theta_{s1}$, $\theta_{s2}$, $\theta_{s3}$ represent the rotation angles of the three self-difference buffer motors 302 and these angles can be measured through the angle encoders of the self-difference buffer motors 302;

$I_p$ represents a rotational ratio of the self-difference buffer motor 302 to the gear 313;

From the above mentioned formula, it can be concluded that a relationship between the main buffer motor 301, the self-difference buffer motor 302 and the six degrees of freedom movement of the docking ring is as follows:

$$[\theta_{m1} \quad \theta_{m2} \quad \theta_{m3} \quad \theta_{s1} \quad \theta_{s2} \quad \theta_{s3}]^T = \underline{S}\underline{J}\dot{\underline{q}}$$

wherein, $$\underline{S} = \begin{bmatrix} \underline{S_1} \\ \underline{S_2} \end{bmatrix},$$

$$\dot{\underline{q}} = [\dot{x}, \dot{y}, \dot{z}, \dot{\phi}, \dot{\psi}, \dot{\theta}]^T,$$

J represents a speed Jacobian matrix between the six degrees of freedom motion q of the active docking ring 101 and the screw length changes L.

It is defined that a torque of the main buffer motor:

$$M=[M_{m1}, M_{m2}, M_{m3}, M_{s1}, M_{s2}, M_{s3}]^T,$$

wherein $M_{m1}$, $M_{m2}$, $M_{m3}$ represent drive torques of the main buffer motor 301; $M_{s1}$, $M_{s2}$, $M_{s3}$ represent drive torques of the self-difference buffer motor 302; F represents a force of the six degrees of freedom upon the docking ring 101, so called an equivalent force of the docking ring.

When the docking rings 101 of the docking mechanisms are ready for docking, and a certain constant motion speed is applied to the docking ring 101 in the direction of a certain degree of freedom, a relationship between the force/torque of the docking ring and the displacement exhibited by the docking ring 101 is called an equivalent efficiency of the docking ring in such direction.

According to the force Jacobian matrix, a relationship between the motor torque M and the equivalent force F of the docking ring 101 can be obtained as follows:

$$M=J_F F$$

wherein, $J_F$ represents the force Jacobian matrix between the motor torque and the equivalent force of the docking ring, and such matrix can be derived from its corresponding speed Jacobian matrix.

When the motor torque M is set, the equivalent force of the docking ring can be calculated based on the above mentioned formula. In the same manners, the motor torque M for each motor can be derived based on the equivalent force of the docking ring as well.

The control system 106 pre-determines the control law for the motors. The control law for the main buffer motor 301 and the self-difference buffer motor 302 are represented as follows:

$$M_{mj}=K_{mi}\theta_{mj}(t)+C_{mi}\dot{\theta}_{mj}(t)+m_{mi}(i=1,2;j=1,2,3)$$

$$M_{sj}=K_{si}\theta_{sj}(t)+C_{si}\dot{\theta}_{sj}(t)+m_{si}(i=1,2;j=1,2,3)$$

wherein i represents the mission state, being set as 1, 2 in the embodiment, showing a capture correcting state and a buffer correcting state, respectively.

$M_{mj}$ represents the drive torque needed by the jth main buffer motor 301;

$M_{sj}$ represents the drive torque needed by the jth self-difference buffer motor 302;

$\theta_{mj}(t)$, $\dot{\theta}_{mj}(t)$ represent a rotation angle and an angular velocity of the jth main buffer motor 301, respectively;

$\theta_{sj}(t)$, $\dot{\theta}_{sj}(t)$ represent a rotation angle and an angular velocity of the jth self-difference buffer motor 302, respectively;

$K_{mi}$, $C_{mi}$ represent an elastic coefficient and a damping coefficient of the main buffer motor 301 at the ith mission state, respectively;

$K_{si}$, $C_{si}$ represent an elastic coefficient and a damping coefficient of the self-difference buffer motor 302 at the ith mission state, respectively;

$m_{mi}$ represents a function constant term of the main buffer motor 301 at the ith mission state; and $m_{si}$ represents a function constant term of the self-difference buffer motor 302 at the ith mission state.

Alternatively, the control law functions of the main buffer motor 301 and the self-difference buffer motor 302 described as above can be optionally set as piecewise functions, thus having different coefficients and constant values according to different rotation angles as well as angular velocity magnitudes. When taking the self-difference buffer motor 302 as an example, at a constant angular velocity and under the said control law, the rotation angleto-torque of the self-difference buffer motor 302 generally has a curve form as shown in FIG. 6.

Alternatively, for a better docking success rate, the docking process can be divided as a plurality of mission states for individually setting their control law coefficients.

According to the force Jacobian matrix $J_F$, the equivalent force F of the docking ring 101 can be derived from the motor torque M. By properly setting the motor control law, the required equivalent force F of the docking ring can be obtained. According to the transmission characteristics of the docking mechanism of the present invention, the torque of the self-difference buffer motor $M_{s1}$, $M_{s2}$, $M_{s3}$ mainly determine the equivalent efficiency of the rolling angle and the lateral displacement of the docking ring 101. The torque of the main buffer motor $M_{m1}$, $M_{m2}$, $M_{m3}$ mainly determine the equivalent efficiency in the axial and yaw direction of the docking ring 101.

Figure 6:
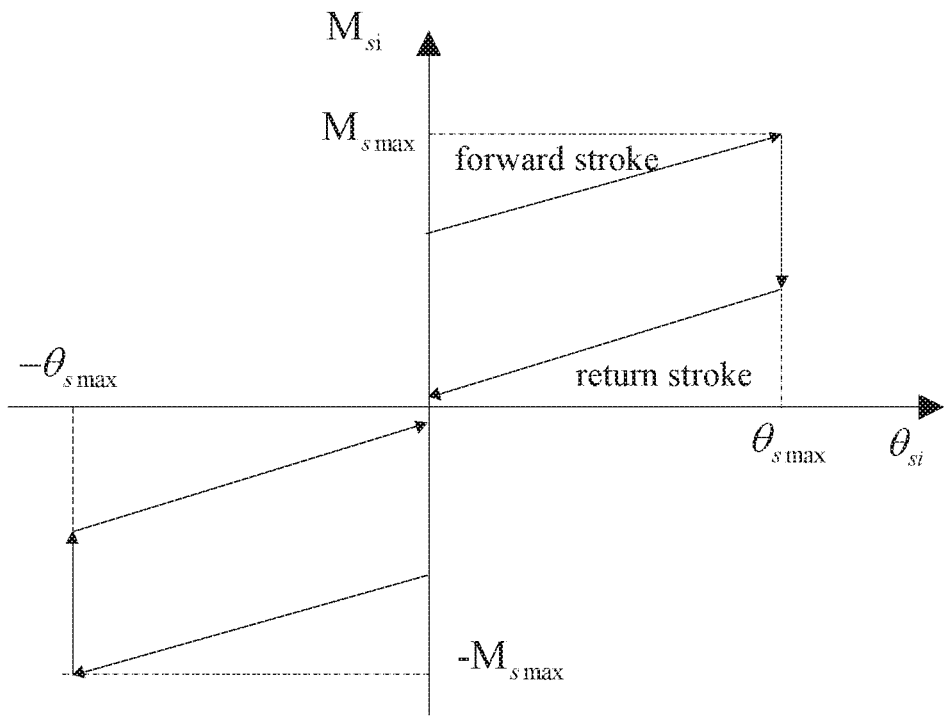
FIG. 6 shows a rotation angle-to-torque curve of the self-difference buffer at a constant angular velocity and under a certain said control law according to one embodiment of the present invention.
Figure 7:
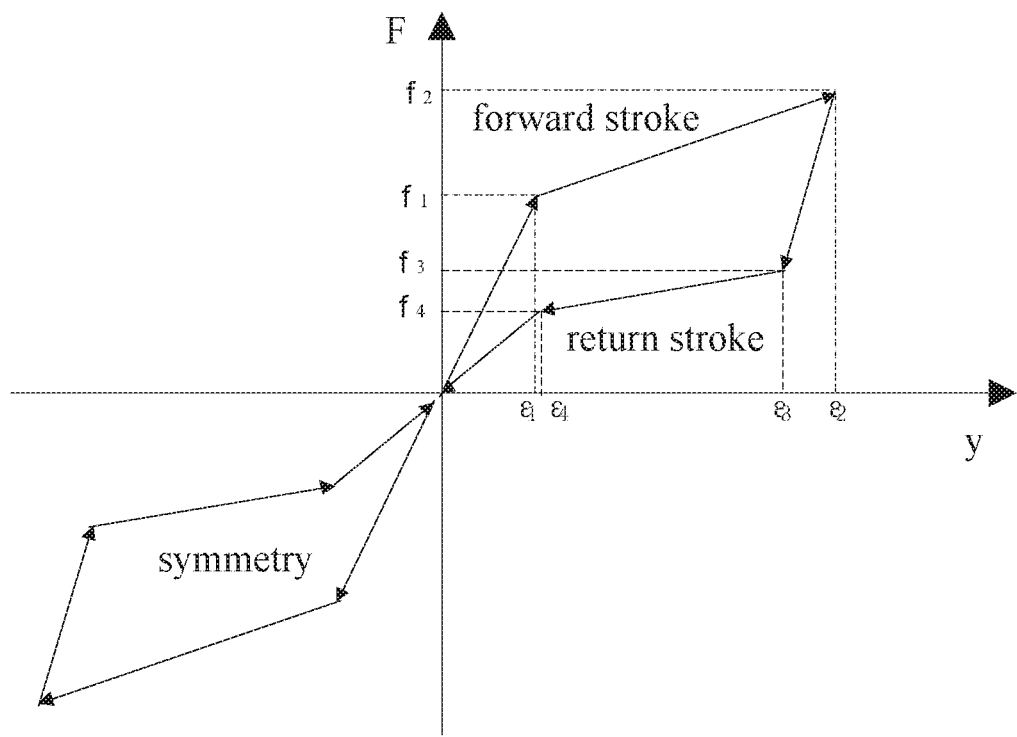
FIG. 7 shows an equivalent efficiency curve of the docking ring in Y-direction and under a certain said control law according to one embodiment of the present invention.
Figure 8:
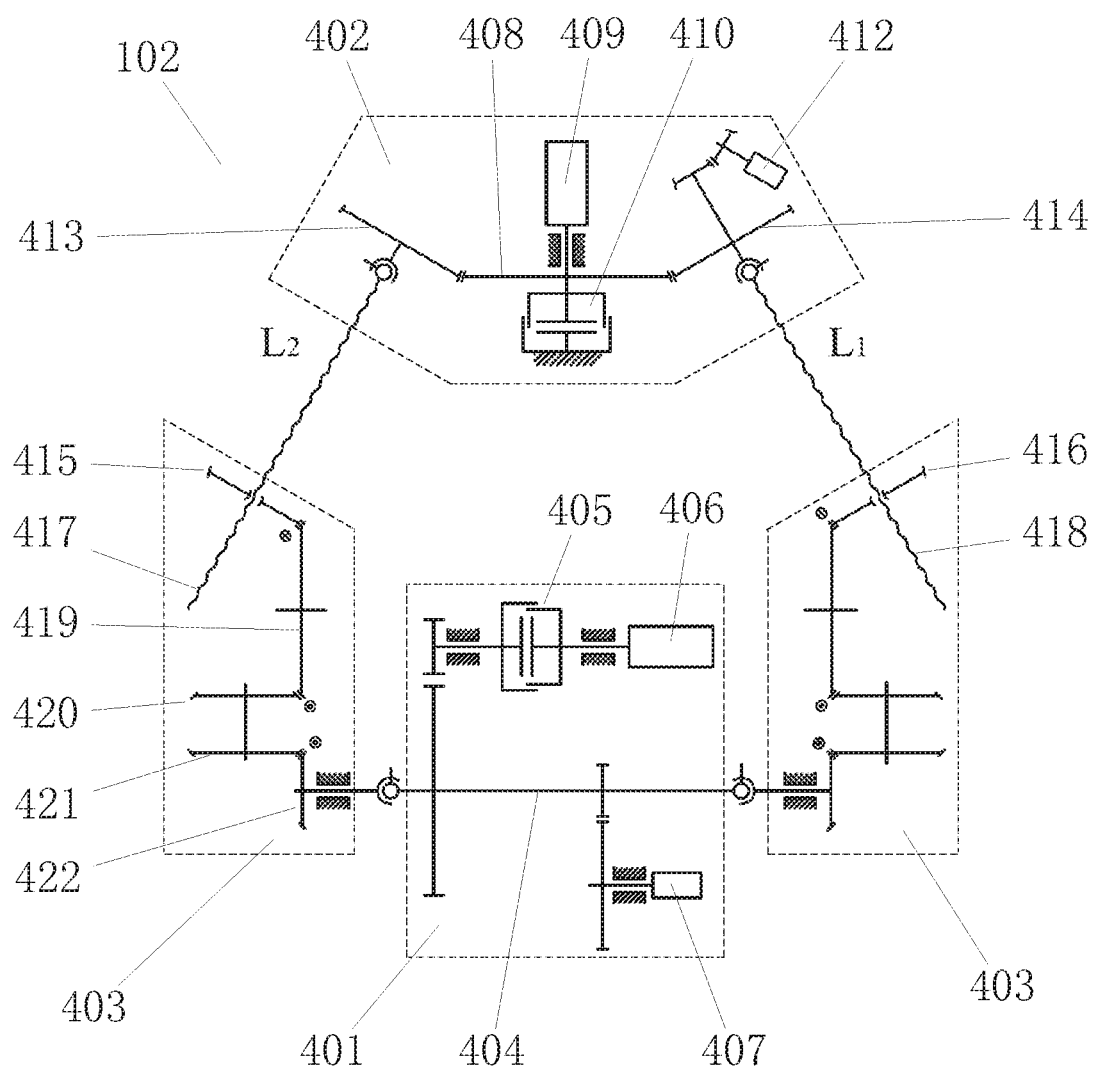
FIG. 8 shows a functional diagram of a buffer mechanism according to another embodiment of the present invention.

In the embodiment of the present invention, when the main buffer motor 301 and the self-different buffer motor 302 both show the rotation angle-to-torque characteristic curves as shown in FIG. 6, the equivalent efficiency of the docking ring 101 in six directions should have similar characteristics. Take the equivalent efficiency of the docking ring 101 in Y-direction as an example. The equivalent efficiency curve of the docking ring 101 in Y-direction is generally shown as FIG. 7, which represents as a hysteresis curve.

The control system 106 collects signals from angle encoders of the motor, obtains the calculated rotation angle and the rotation speed of the motor, and controls the motor in time according to the motor control law. Regarding power of the motor, the related expressions are as follows:

$$V_{mi} = V(M_{mi}, n_{mi}) = M_{mi}\eta_1 + k_1 n_{mi} (i=1,2,3)$$

$$V_{si} = V(M_{si}, n_{si}) = M_{si}\eta_2 + k_2 n_{si} (i=1,2,3)$$

wherein, i represents the motor number; $V_{mi}$ represents the supplied voltage of the ith main buffer motor 301; $V_{si}$ represents the supplied voltage of the ith self-difference buffer motor 302; $\eta_1$, $\eta_2$ represents the transfer coefficient of the main buffer motor 301 and the self-difference buffer motor 302, respectively; $n_{mi}$ represents the rotate speed of the ith main buffer motor 301; and $n_{si}$ represents the rotate speed of the ith self-difference buffer motor 302.

The semi-active control working mechanism of the buffer damping employed in the present invention is described as follows.

When being ready for docking, the active docking ring 101 is extended out, and the control system 106 supplies power to the main buffer motor 301 and the self-difference buffer motor 302 as pre-determinedly. The control system 106 sets the control modes of the main buffer motor 301 and the self-difference buffer motor 302 to capture modes.

When two docking mechanisms are in docking process and make mechanical contact, the active docking ring 101 of the active docking mechanism is affected by a docking force and works upon the six screws. The screws then transmit the load to the main buffer motor 301 and the self-difference buffer motor 302 through a transmission chain.

When the docking force exceeds the motor holding torque, the screws show expansion or contraction, and the corresponding main buffer motor 301 and self-difference buffer motor 302 start to rotate. It should be noticed that the main buffer motor 301 and the self-difference buffer motor 302 at this time keep holding capability of the torque.

The control system 106 collects signals from the angle encoders of the main buffer motor 301 and the self difference buffer motor 302, and the control system 106 determines if the docking rings of two docking mechanisms are in contact based on these information. When the result shows that they are in contact, the control system 106 controls each of the motors according to the preset control law, which is normally servo control.

Preferably, after the docking rings are in contact, the control system 106 supplies power to the main buffer motor 301 according to a preset voltage to push the docking ring 101 forward. At the same time, the control system 106 limits the maximum speed of the main buffer motor 301. During the pushing-out process, the average extending speed of the screws in each set is inversely proportional to the resistance they encounter. When the screws in the same set are subjected to resistance, they will decelerate the extending speed. On the other hand, they will accelerate the extending speed under a driving force. As a result, the active docking ring 101 of the active docking mechanism passively generates position and attitude deviations, and adapts to the relative deviation of the two docking mechanisms.

When the control system 106 determines the docking rings of two spacecrafts are mated and realized in capturing, the control system 106 changes the control modes of the main buffer motor 301 and the self-difference buffer motor 302 from capture modes to buffer modes. The control system 106 raises the supplied voltage of the main buffer motor 301 and the self-difference buffer motor 302 so as to improve the driving capabilities of the motors, thereby increasing the buffer capabilities of the docking rings.

In a buffer state, the docking mechanism consumes relative motion energy and corrects the position and attitude deviation of the docking ring 101. After the buffering is complete, the length $L_s$ of the six screws (s indicates the number of each screw) should be equal, and the length $L_u$ of the screws after being corrected by the docking ring 101 is set. The control system 106 controls the motor according to a preset control law of the buffer mode, and the signals from the angle encoders of the main buffer motor 301 and the self-different buffer motor 302, such that the relative motion between the two spacecrafts is stopped and corrected, that is, a sum of lengths of the six screws should be equal.

It should be noticed that the length $L_u$ of the screws after being corrected by the docking ring 101 can be predetermined (i.e. ground preset or flight control injection), or can be set by the control system 106 according to a prescribed program based on its buffer process being executed.

Also, it should be explained that, according to a variety of control law, the numbers of repeated oscillations of the docking ring 101 in the active docking mechanism will vary as well.

The control and adjustment principles of the control system 106 will be described as follows.

In order to ensure that the active docking ring 101 and the passive docking ring 201 of the two spacecrafts can get closer to each other during the docking capture process, the docking ring 101 of the docking device 100 is required to be automatically adapted to an initial deviation, and the energy consumption and the docking force should be possibly minimized during the adaptation process. This requires a small stiffness damping of the buffer system of the docking device 100. In other words, the equivalent force of the docking ring 101 should be small. In this case, the buffer system in the capture state shows "soft" characteristic and is also able to be actively adapted to the deviation. After the capture signal is given, the buffer system needs to have sufficient damping to buffer its relative motion during the motion process specified by the active docking ring 101, and the equivalent force of the docking ring 101 is set to a higher level. At this time, the buffer system shows a relatively "hard" characteristic being different from that in the capture state. All these characteristics can be implemented by the control system 106 adjusting the operating mode.

In addition, in the docking operation, since the characteristics of the docking spacecraft (such as quality characteristics, initial contact conditions for docking) are different, there exist differences among the buffer damping characteristics of the docking mechanisms. In an example of the active docking device 100, parameters of the control system 106 are configurable, and can be adjusted through putting simple parameters for adjusting the buffer damping characteristics thereof. Thus, the parameter configuration ensures that the active docking device 100 can accommodate specific spacecraft characteristics (e.g., quality, centroid offset, approach speed and angular velocity of the spacecrafts). Therefore, the docking device of the present invention has a wide docking adaptability and wide docking capability.

The working state and process of the docking mechanism according to the Embodiment 1 of the present invention will be described as follows.

At first, the active docking ring 101 of the active docking mechanism is pushed out from a retraction state to a ready-for docking position (i.e. extending state), and the active docking ring 101 of the active docking mechanism is unlocked (it was locked for overcoming the spacecraft launch load environment). The control system 106 supplies and increases power to the main buffer motor 301 and the self-difference buffer motor 302, and drives the main buffer motor 301 to push out the docking ring 101 according to a predetermined position of the docking ring 101. After the docking ring is in its right place, the control device adjusts the control law of the motor to the capture mode.

Secondly, the chasing spacecraft moves to a range of initial contact conditions for docking. The initial contact conditions for docking are defined as a predefined area surrounding the docking device.

Thirdly, a guiding alignment state of the docking device 100 is entered. The docking rings of the two spacecrafts are in contact with each other. And, under the interaction force, the active docking ring 101 of the active docking device 100 is deflected. At this time, the control system 106 of the active docking device 100 controls the motor according to a predetermined capture mode. Under such circumstance, the buffer system of the docking device 100 shows a "soft" characteristic, whereby implementing the guiding and aligning of the docking.

Fourthly, capturing the active docking device 100 is performed, in which a flexible connection is implemented through the neighboring active docking device 100 and passive docking device 200 being locked together through a mechanical capture lock 103 and a pallet 202 (or an electromagnet attraction). Afterwards, the capture sensing device of the docking ring 101 is triggered and giving capture signals.

Fifthly, a buffer state is entered. The relative motion energy and residual relative motion between the two spacecrafts are absorbed and consumed by the reaction force provided by the active docking ring 101. At this time, the control system 106 of the active docking device 100 controls the main buffer motor 301 and the self-different buffer motor 302 to enter the buffer working modes. Under such circumstance, the buffer system of the docking device 100 shows a "hard" characteristic.

Sixthly, a pulling-closer state is entered. The two spacecrafts are pulled closer to each other by the active docking device 100 of the chasing spacecraft. And, a precise alignment is accomplished through a guiding pin mounted on an upper surface of the docking frame 104.

At final, a rigid connection state is entered. When the docking frames 104 of the two spacecrafts are in the close position, the structural latch 105 works, completes the rigid connection, and provides rigid connection force and sealing force for the two docking surfaces, whereby finishing sealing of the docking channel. This part of working mechanisms is the same as that in the Shenzhou-8 spacecraft in carrying human beings.

Embodiment 2

Please refer to FIG. 8 to FIG. 12. The differences between the second embodiment and the Embodiment 1 are:

Each set of the buffer mechanisms further comprises a main clutch. The main buffer drives the screw nut assemblies to extend and contract only when the main clutch does not skid. The main clutch is configured to have a clutch torque before capturing, which is smaller than the clutch torque after the capturing is complete. The main clutch will skid when its clutch torque is exceeded.

Each set of the buffer mechanisms further comprises an auxiliary buffer clutch. The self-difference buffer drives the screw nut assemblies to extend and contract only when the auxiliary buffer clutch skids. The auxiliary buffer clutch is configured to have a clutch torque before capturing, which is smaller than the clutch torque after the capturing is complete. The auxiliary buffer clutch will skid when its clutch torque is exceeded.

Regarding the Main Buffer

According to the second embodiment of the present invention, the main buffer 401 further comprises a main buffer motor 406 and main buffer transmission components. The two screw nut assemblies 403 in each set are driven by the corresponding main buffer motor 406 through the main buffer transmission components. The second embodiment is similar to the first embodiment, having only the difference as: the main clutch 405 is further disposed between the main buffer motor 406 and the main buffer transmission components, or between the main buffer transmission components and the screw nut assembly 403, or there in between the main buffer transmission components.

The main buffer transmission components mainly comprise a main buffer shaft 404; in a further alternative embodiment of the present invention, the rotor output shaft of the main buffer motor 406 is coaxial and directly connected to the main buffer shaft 404. For better reliability and buffering capability, the main buffer motors 406 can also be used in series optionally.

The main buffer motor 406 of in the embodiment implements motion transmission and power transmission through the main clutch 405 and the main buffer shaft 404. The skid torque of the main clutch 405 can be adjusted in time when necessary. The main buffer motor 406 can be either a motor or a combination of a motor and a deceleration device. The main buffer motor 406 is provided with a brake holding device or has a rotation angle holding function. Preferably, the holding function of the main buffer motor 406 is realized under the control of the control device.

A brake torque or holding torque of the main buffer motor 406 should be greater than the maximum skid torque of the main clutch 405. When the main clutch 405 does not skid, the output power of the main buffer motor 406 drives the main buffer shaft 404 to rotate synchronously through the main clutch 405. When a torque is further applied to the main buffer shaft 404, the torque acts on the main clutch 405 and the main buffer motor 406 through a transmission chain. When the torque transmitted to the main clutch 405 exceeds the skid torque of the main clutch 405, the main clutch 405 starts to skid.

Figure 9:
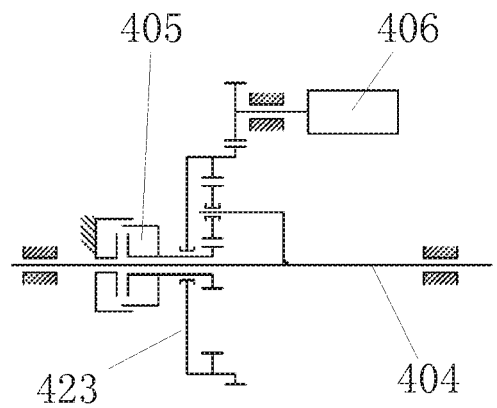
FIG. 9 shows a schematic diagram of a main buffer motor and a main clutch via a planetary deceleration transmission mechanism according to another embodiment of the present invention.

The main buffer motor 406 and the main clutch 405 are connected in a "series" form. Alternatively, the main buffer motor 406 and the main clutch 405 can also be connected in a "parallel" form. FIG. 9 shows an embodiment of a "parallel" connection. This embodiment performs differential transmission between the main buffer motor 406, the main clutch 405 and the main buffer shaft 404 via a planetary transmission mechanism 423.

In an alternative embodiment of the present invention, an elastic device can be further disposed between the main clutch 405 and the main buffer shaft 404, which is usually a scroll spring having a certain pre-tightening torque for protecting the transmission chain. It is also possible to further disposed a pre-tightening compression spring at an upper end of the screw 417 (418) for damping and buffering the axial impact load of a larger screw.

Each set of the buffer mechanisms 102 further comprises a screw displacement sensor 407 for detecting the expansion and contraction displacement of the screw nut assemblies 403. The main buffer 401 is controlled according to the data detected by the screw displacement sensor 407, thereby satisfying the motion requirement in the docking process. The screw displacement sensor 407 can be used to measure the rotation angle of the main buffer shaft 304. In the embodiment of the present invention, the screw displacement sensor 407 can employ various measuring means such as, but not limited to, an angle encoder, a resolver, a potentiometer, and so on.

Regarding the Self-Difference Buffer 402

The self-difference buffer 402 comprises two gears 413, 414 and a idle gear 408. The structure is basically similar to that in Embodiment 1, having the main difference as: an auxiliary buffer clutch 410 is further disposed between the idle gear 408 and the self-different drive structure.

The coil spring mechanism 409 and the auxiliary buffer clutch 410 are both connected to the idle gear 408 for synchronous transmission. Certainly, the coil spring mechanism 409 and the auxiliary buffer clutch 410 are used as buffer energy consuming components, and these energy consuming components can also be connected to the gear 408, the gear 413 or the gear 414, and the function is equivalent. The buffer energy-consuming components of the self-difference buffer 402 can be a combination of a spring and a clutch, or at least one of the spring, the motor, the electromagnetic damper, and the clutch.

Similarly to the Embodiment 1, each set of the buffer mechanisms 102 further comprises a screw sell-difference sensor 412 which is used for detecting the difference between the expansion and contraction displacements of the two screw nut assemblies in the same set. The screw self-difference sensor 412 can be used for measuring the rotation angle of the idle gear 308. In an optional embodiment of the present invention, the screw self-difference sensor 412 may adopt a variety of measurement means, such as but not limited to angle encoders, resolvers, potentiometers, and so on.

Figure 10:
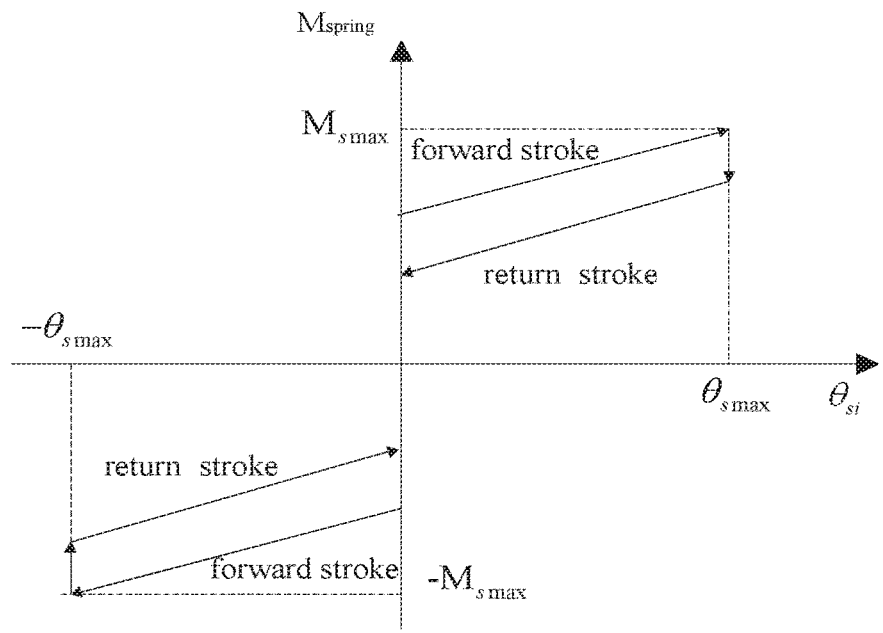
FIG. 10 shows a load characteristic curve of a coil spring mechanism according to another embodiment of the present invention.

The difference between the embodiment and the Embodiment 1 further comprises, the damping torque of the self-difference buffer $M_{s1}$, $M_{s2}$, $M_{s3}$ are provided commonly by the coil spring mechanism 409 and the auxiliary buffer clutch 410 for buffering and correcting the rolling angle and the lateral displacement of the active docking ring 101, wherein the coil spring mechanism 409 is used to correcting. When the position and attitude change of the active docking ring 101 cause the lengths of the two screws in the same set to be different, the coil spring mechanism 409 stores energy at this time, thereby is implemented for buffering. After the docking collision disappears, since the coil spring mechanism 409 releases the energy, the lengths of the two screws in the same set return to be equal, thereby performing the correcting. The coil spring mechanism 409 should have a certain pre-tightening torque at its zero position. FIG. 10 shows the typical rotation angle-torque characteristic curve of the coil spring mechanism 409. Due to the internal friction of the spring, there exists certain difference in the torques between its forward and return strokes.

The damping torque of the main buffer $M_{m1}$, $M_{m2}$, $M_{m3}$ are mainly provided by the main clutch 405 and the main buffer motor 406 for buffering and correcting the active docking ring 101 in axial and deflection directions.

According to the embodiment of the present invention, the main clutch 405 and the auxiliary buffer clutch 410 are magnetic powder clutches, in which the skid torque of the clutch $M_{Ci}$ is related to the supplied DC voltage $V_i$.

In the capture state, the control device controls the main clutch 405, the auxiliary buffer clutch 410, and the main buffer motor 406 in accordance with the capture mode, and a skid torque of the main clutch 405 and the auxiliary buffer clutch 410 is set to a first gear torque. In the buffer state, the control device controls the main clutch 405, the auxiliary buffer clutch 410, and the main buffer motor 406 in accordance with the buffer mode, and the skid torque of the main clutch 405 and the auxiliary buffer clutch 410 is set to a second gear torque. The second gear torque should be greater than the first gear torque. It should be noticed that the gear position of the skid torque refers to the demands for different skid torques set by the same clutch according to different working state requirements. It can be a fixed value or a variable that changes with time or other parameters. As a result, even under the capture mode, a skid torque of the main clutch 405 and the auxiliary buffer clutch 410 may not be exactly the same.

The control device adjusts the supplied voltage $V_i$. of the main clutch 405 and the auxiliary buffer clutch 410 for changing the skid torque of the clutches. By such, adjusting the equivalent efficiency of the docking ring 101 is achieved.

It should be noticed that, other types of damping mechanisms (such as electromagnetic clutch mechanism, magnetorheological damper, hysteresis clutch or electromechanical control device, etc) can also be adopted for replacing the magnetic powder clutches. According to different types, the resistance torque of such mechanism is not only related to its holding torque, but also has a certain functional relationship with its skid speed.

The semi-active control working mechanism of the buffer damping employed in the present invention is described as follows.

When being ready for docking, the active docking ring 101 is extended out, and the control system supplies power to the main clutch 405 and the auxiliary buffer clutch 410 as pre-determinedly.

When two docking mechanisms are in docking process and make mechanical contact, the active docking ring 101 of the active docking mechanism is affected by a docking force and works upon the screws 417, 418. The screws then transmit the load to the main buffer 401 and the self-difference buffer 402 through a transmission chain.

When the docking force exceeds the skid torque of the main buffer 401, the screws show expansion or contraction, and the corresponding main buffer shaft 404 starts to rotate. It should be noticed that at this time, the main buffer motor 406 is not powered, and has a certain self-locking function or an angle maintaining function. If the main buffer motor 406 does not have the self-locking function (or the self-locking function fails), then the docking force is transmitted to the main buffer motor 406, causing the reverse rotation, and the main clutch 405 may not skid. However, this does not affect the extension or contraction of the screw.

According to the transmission principle, the axial load difference experienced by the screws in the same set will act on the self-difference buffer 402. When the load difference exceeds the damping torque of the self-difference buffer 402 (i.e. a sum of the damping torques of the coil spring mechanism 409 and the auxiliary buffer clutch 410), the idle gear 408 starts to rotate.

The control device collects signals of the screw displacement sensor 407 and the screw self-difference sensor 412, and determines if the docking rings of the two docking mechanisms are in contact according to data from the screw displacement sensor 407 and the screw self-difference sensor 412. When it is determined that they are in contact, the control device supplies power to each main buffer motor 406 and controls the screws in the same set to extend forward. During the pushing-out process, the extending speed of the screws in each set is inversely proportional to the resistance they encounter. When the screws in the same set are subjected to resistance (a pressing force in this case), they will decelerate the extending speed (or so called the extending speed under "no load"). On the other hand, they will accelerate the extending speed under a driving force. It should be pointed out that at this time the resistance of the screws in the same set does not mean that the two screws are both subjected to the pressing force. The possible situation is that one screw is pulled and the other screw is pressed, but the pressing force is greater than the pulling force such that the sum is the pressing force. Nevertheless, when the pulling force or the pressing force exceeds the skid limit value of the main clutch 405, the main clutch 405 starts to skid. At the same time, the screws in the same set encounter different load, which will force the idle gear 408 of the self-difference buffer 402 to rotate. Thus, the active docking ring 101 of the active docking device 100 passively generates position and attitude deviations so as to accommodate the relative deviation of the two docking mechanisms.

When the control system determines the docking rings of two spacecrafts are contacted and realized in capturing, the control system changes the working modes of the main clutch 405, the auxiliary buffer clutch 410 and the main buffer motor 406 from capture modes to buffer modes. The control system raises the supplied voltage of the main clutch 405 and the auxiliary buffer clutch 410 so as to increase the skid torque of the main clutch 405 and the auxiliary buffer clutch 410, thereby improve the buffer capabilities of the docking rings. The specific design value of the skid torque is related to the initial conditions of the docking and the spacecraft target, and can be realized by ground preset or flight control injection before docking.

In a buffer state, the docking mechanism consumes relative motion energy and corrects the position and attitude deviation of the docking ring 101. After the buffering is complete, the length $L_s$ of the six screws (s indicates the number of each screw) should be equal, and the length $L_u$ of the screws after being corrected by the docking ring 101 is set. The control system controls the main buffer motor 406 according to signals of the screw displacement sensor 407 such that the three screw displacement sensors 407 reach the preset values, that is a sum of length of the screws in three sets are equal to $2L_u$.

The expression is established, as $L_1+L_2=L_3+L_4=L_5+L_6=2L_u$.

At the same time, the position and attitude change of the docking ring 101 occur under the action of the docking collision force, and the lengths of the screws 417 and 418 in the same set are different. The coil spring mechanism 409 stores energy for performing buffering. The magnetic powder auxiliary buffer clutch 410 skids for energy consumption. When the length difference between the screws in the same set is reduced, the coil spring mechanism 409 begins to release energy, overcomes the skid torque of the magnetic powder auxiliary buffer clutch 410, and makes the length of the screws in the same set become identical, thereby performing correcting. Thus, buffering and correcting of the docking ring 101 can be achieved through the main buffer 401 and the self-difference buffer 402. It should be noticed that the length $L_u$ of the screws after being corrected by the docking ring 101 can be predetermined (i.e. ground preset or flight control injection), or can be set by the control system according to a prescribed program based on its buffer process being executed.

The control device controls the rotate direction of the main buffer motor 406 based on data from the screw displacement sensor 407. Moreover, the control device can also closed-loop control the rotate direction and rotate speed of the main buffer motor 406 based on data from the screw displacement sensor 407. According to a variety of control law, the numbers of repeated oscillations of the docking ring 101 in the active docking mechanism will vary as well.

Preferably, in order to ensure that the lengths of the screws in the same set recover to be identical, the skid torque of the magnetic powder auxiliary buffer clutch 410 in the buffer state should be smaller than the recovery torque of the coil spring mechanism 409, which can be implemented by adjusting the skid torque of the magnetic powder auxiliary buffer clutch 410 in the buffer state. Also, $L_u$ can be set to the limit length of the screw (i.e. the longest length that the screw can extend).

Furthermore, the coil spring mechanism 409 and the auxiliary buffer clutch 410 in the self-difference buffer 402 can also be replaced by a motor to approximate the damping performance.

According to the embodiment of the present invention, for simplifying the control, the main buffer motor 406 can also be locked during the capturing and buffering process without rotation. After the relative motion between the two spacecrafts stops, the control device controls the main buffer motor 406 to coordinate the actions and correct the docking ring 101.

Figure 11:
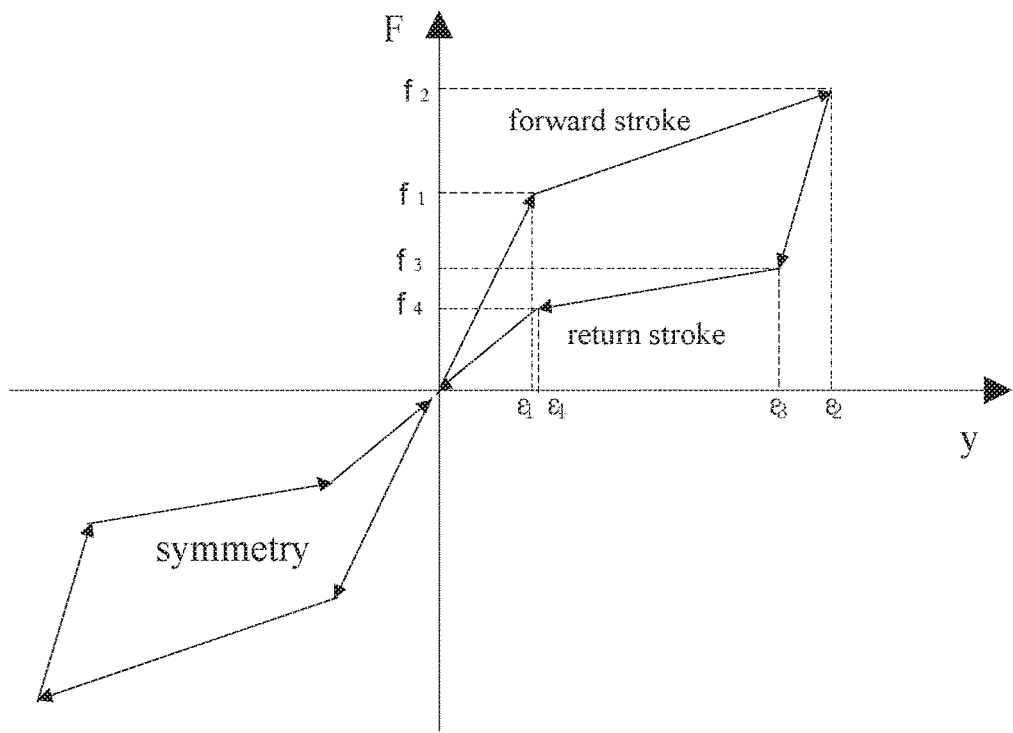
FIG. 11 shows an equivalent efficiency curve of the docking ring in Y-direction according to another embodiment of the present invention.
Figure 12:
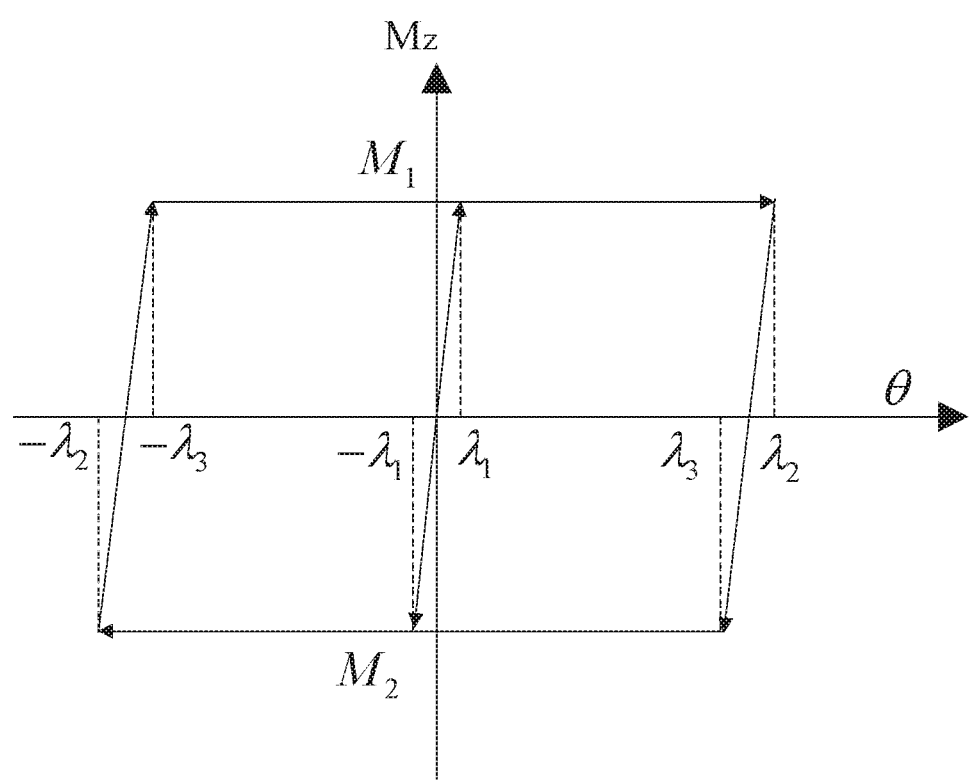
FIG. 12 shows an equivalent efficiency curve of the docking ring in pitch-direction according to another embodiment of the present invention.

FIG. 11 and FIG. 12 show the equivalent efficiency of the docking ring in the docking mechanism in the capture buffer state. These curves are derived according to the relationship between the damping torque of the buffer M and the equivalent force F of the docking ring 101.

FIG. 11 is a schematic diagram showing the equivalent efficiency of the docking ring in the lateral Y direction. The characteristic curve is a hysteresis curve. When the docking ring moves from zero position along with the Y forward direction to $\varepsilon_1$, the docking ring overcomes the internal clearance of the screw, gear, etc. When the lateral force of the docking ring reaches $f_1$, all the structural clearances are eliminated. Similarly, when the docking ring 101 returns back from the lateral position $\varepsilon_2$ and to $\varepsilon_3$, all the clearances are eliminated. In the curve, the slope of the curve is mainly related to the efficiency of the coil spring mechanism 409 of the self-difference buffer 402. The load difference between the forward strokes $\varepsilon_1$, $\varepsilon_2$ and the return strokes $\varepsilon_3$, $\varepsilon_4$ is mainly caused by the auxiliary buffer clutch 410 and its transmission friction. In the same manners, the equivalent efficiency curves of the docking ring 101 in the roll direction and the Z direction are similar.

FIG. 12 is a schematic diagram showing the equivalent efficiency of the docking ring 101 in the pitch direction. The size of $\lambda_1$ is related to the internal clearance and elasticity of the docking mechanism. In the curve, the equivalent force $M_z$ is related to the efficiency of the main buffer 401. Considering that the pitch angle $\theta$ of the docking ring does not change much, the equivalent efficiency in the pitch direction can be processed according to a constant value, and generally $M_1=M_2$. In the same manners, the equivalent efficiency curves of the docking ring 101 in the yaw direction and in the X direction are similar.

FIG. 11 and FIG. 12 show the equivalent efficiency curves of the docking ring being targeted by the main buffer motor 406. In order to improve the capture probability and the buffering efficiency, the control device not only adjusts or switches the skid torque parameters of the main clutches 405 and 410 according to work states, but also needs to adjust or switch the motion parameters of the main buffer motor 406. Also, the damping efficiency can be adjusted by ground preset or in-orbit injection according to the spacecraft docking target and the docking initial conditions.

The control and adjustment principles of the control system will be described as follows.

In order to ensure that the active docking ring 101 and the passive docking ring 201 of the two spacecrafts can get closer to each other during the docking capture process, the docking ring 101 of the docking device 100 is required to be automatically adapted to an initial deviation, and the energy consumption and the docking force should be possibly minimized during the adaptation process. This requires a small stiffness damping of the buffer system of the docking device 100. In other words, the equivalent force of the active docking ring 101 should be small. Before capture, the skid torque of the clutch is set to a lower level, and the extending speed of the active docking ring 101 is matched with the docking initial conditions and the targets. In this case, the buffer system in the capture state shows "soft" characteristic and is also able to be actively adapted to the deviation. After the capture signal is given, the buffer system needs to have sufficient damping to buffer its relative motion during the motion process specified by the active docking ring 101, and the skid torque of the clutch of the docking ring 101 is set to a higher level. At this time, the buffer system shows a relatively "hard" characteristic being different from that in the capture state. All these characteristics can be implemented by the control system adjusting the operating mode.

In addition, in the docking operation, since the characteristics of the docking spacecraft (such as quality characteristics, initial contact conditions for docking) are different, there exist differences among the buffer damping characteristics of the docking mechanisms (i.e. the above mentioned torque of the clutch). In an example of the active docking device 100, parameters of the control system are configurable, and can be adjusted through putting simple parameters for adjusting the buffer damping characteristics thereof. As a result, the parameter configuration ensures that the active docking device 100 can accommodate specific spacecraft characteristics (e.g., quality, centroid offset, approach speed and angular velocity of the spacecrafts). Therefore, the docking device of the present invention has a wide docking adaptability and wide docking capability.

The working state and process of the docking mechanism according to the Embodiment 2 of the present invention will be described as follows.

At first, the active docking ring 101 of the active docking mechanism is pushed out from a retraction state to a ready-for docking position (i.e. extending state), and the active docking ring 101 of the active docking mechanism is unlocked (it was locked for overcoming the spacecraft launch load environment). A control drive subsystem supplies and increases power to the magnetic powder main clutches 405, 410 (according to the capture mode), and the control device drives the main buffer motor 406 to push out the docking ring 101 according to a predetermined position of the docking ring 101.

Secondly, the active spacecraft moves to a range of initial contact conditions for docking. The initial contact conditions for docking are defined as a predefined area surrounding the docking device.

Thirdly, a guiding alignment state of the active docking device 100 is entered. The docking rings of the two spacecrafts are in contact with each other. And, under the interaction force, the active docking ring 101 of the active docking device 100 is deflected. At this time, the control system of the active docking device 100 controls the magnetic powder main clutches 405, 410 and the main buffer motor 406 to enter the capture working mode. Under such circumstance, the buffer system of the docking device 100 shows a "soft" characteristic, whereby implementing the guiding and aligning of the docking.

Fourthly, capturing the active docking device 100 is performed, in which a flexible connection is implemented through the neighboring active docking device 100 and passive docking device 200 being locked together through a mechanical capture lock 103 and a pallet 202 (or an electromagnet attraction). Afterwards, the capture sensing device of the active docking ring 101 is triggered and giving capture signals.

Fifthly, a buffer state is entered. The relative motion energy and residual relative motion between the two spacecrafts are absorbed and consumed by the reaction force provided by the active docking ring 101. At this time, the control device of the active docking device 100 controls the magnetic powder main clutches and the main buffer motor 406 to enter the buffer working modes. Under such circumstance, the buffer system of the docking device 100 shows a "hard" characteristic.

Sixthly, a pulling-closer state is entered. The two spacecrafts are pulled closer to each other by the active docking device 100 of the active spacecraft. And, a precise alignment is accomplished through a guiding pin sleeve on an upper surface of the docking frame 104.

At final, a rigid connection state is entered. When the docking frames 104 of the two spacecrafts are in the close position, the structural latch 105 works, completes the rigid connection, and provides rigid connection force and sealing force for the two docking surfaces, whereby finishing sealing of the docking channel. This part of working mechanisms is the same as that in the Shenzhou-8 spacecraft in carrying human beings.

To sum up, the present invention discloses a docking system and method thereof, in which no force sensors are needed to participate for controlling. In addition, the Stewart platform positive solution operations are prevented and the instant feedback control in the control system is achieved.

By employing the present invention, it is advantageous of not only effectively buffering the collision load during the docking process, but also realizing the docking and separating with different docking quality targets by changing the clutch torque of the clutch in orbit as well as the running speed of the motor driving device. In addition, a further docking with the existing spacecraft carrying human beings is accomplished. A utility model of the present invention is simple, and thus having the advantages of work reliability, light weight, wide economy and universality.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A spacecraft docking system, comprising:
    an active docking device, comprising an active docking ring and a docking frame; and
    a passive docking device, wherein the active docking device further comprises three sets of buffer mechanisms, each set of the buffer mechanisms comprises a main buffer, two screw nut assemblies, and a self-difference buffer, an upper end and a lower end of the screw nut assembly are movably connected to the active docking ring and the docking frame, respectively;
    the two screw nut assemblies in each set are simultaneously driven and stretched by the main buffer, the two screw nut assemblies are also connected to each other through the self-difference buffer, and the two screw nut assemblies are able to be relatively adjusted and stretched through the self-difference buffer.

2. The spacecraft docking system according to claim 1, wherein the lower ends of the six screw nut assemblies are distributed uniformly along the docking frame, the screw nut assemblies are connected to the active docking ring through the self-difference buffer, and the three self-difference buffers are distributed uniformly along the active docking ring at its periphery.

3. The spacecraft docking system according to claim 1, wherein the main buffer comprises a main buffer motor and main buffer transmission components, and the two screw nut assemblies in each set are driven by the corresponding main buffer motor through the main buffer transmission components.

4. The spacecraft docking system according to claim 1, wherein the self-difference buffer comprises two gears and an idle gear, the two gears are each connected to one of the screw nut assemblies, the two gears are associated with the same idle gear, and the idle gear is further controlled by a self-difference drive structure.

5. The spacecraft docking system according to claim 4, wherein the self-difference drive structure comprises a self-difference buffer motor, and/or a spring structure, and/or a damper, and/or a clutch.

6. The spacecraft docking system according to claim 4, wherein the self-difference drive structure is connected to the associated idle gear through an acceleration or deceleration device.

7. The spacecraft docking system according to claim 1, wherein each set of the buffer mechanisms further comprises a main clutch, the main buffer drives the screw nut assemblies to extend and contract only when the main clutch does not skid, the main clutch is configured to have a clutch torque before capturing, which is smaller than the clutch torque after the capturing is complete, and the main clutch will skid when its clutch torque is exceeded.

8. The spacecraft docking system according to claim 1, wherein each set of the buffer mechanisms further comprises an auxiliary buffer clutch, the self-difference buffer drives the screw nut assemblies to extend and contract only when the auxiliary buffer clutch skids, the auxiliary buffer clutch is configured to have a clutch torque before capturing, which is smaller than the clutch torque after the capturing is complete, and the auxiliary buffer clutch will skid when its clutch torque is exceeded.

9. The spacecraft docking system according to claim 1, wherein each set of the buffer mechanisms further comprises a screw displacement sensor for detecting expansion and contraction displacement of the screw nut assemblies, and/or a screw self-difference sensor for detecting a difference between the expansion and contraction displacements of the two screw nut assemblies in the same set, wherein the main buffer and the self-difference buffer are controlled according to data detected by the screw displacement sensor and/or the screw self-difference sensor, thereby meeting movement needs in a docking process.

10. The spacecraft docking system according to claim 9, wherein the main buffer is performed for controlling expansion and contraction movement of the screw nut assemblies through a rotary motion, the self-difference buffer is performed for adjusting the relative expansion and contraction movements of the two screw nut assemblies through the rotary motion, and a rotary encoder, a potentiometer or an angle encoder is employed for implementing the screw displacement sensor and/or the screw self-difference sensor.

11. The spacecraft docking system according to claim 1, wherein the screw nut assembly comprises a screw, a nut and a transmission gear set, the nut is driven to rotate by the main buffer through the transmission gear set, the screw is matched with the nut, the adjustable expansion and contraction is performed due to a rotation of the nut, the screw is connected to the active docking ring, and the two screws in the same set are performed for adjusting their relative expansion and contraction adjustment by the self-difference buffer.

12. The spacecraft docking system according to claim 1, further comprising a control device, wherein the control device controls the main buffer and the self-difference buffer according to the detected expansion and contraction state of the screw nut assemblies to meet motion requirements of a docking process.

13. A spacecraft docking method adopting the spacecraft docking system according to claim 1, comprising:
    S1: the main buffer and/or the self-difference buffer are adjusted to a capture mode, and the six screw nut assemblies are driven out by the three main buffers such that the active docking ring is pushed out;
    S2: after the active docking ring is in contact with the passive docking device, the active docking ring is deflected under the interaction force, and the screw nut assemblies are driven and pushed out by the main buffer and/or the self-difference buffer according to the expansion and contraction data of the screw nut assemblies collected from the main buffer and/or the self-difference buffer, so as to implement the corresponding guiding and aligning;
    S3: the active docking ring and a passive docking ring of the passive docking device are flexibly connected through a capturing device thereon, after the flexible connection is completed, the main buffer and/or the self-different buffer are adjusted to a buffer mode, and a capture sensing device is triggered, entering step S4 or S5;

S4: according to the expansion and contraction data of the screw nut assemblies collected from the main buffer and/or the self-difference buffer, the expansion and contraction situation of the screw nut assemblies is controlled due to the main buffer and/or the self-difference buffer so as to achieve its desired situation, wherein the expansion and contraction situation of the two screw nut assemblies in the same set is identical; then, entering step S6;

S5: the two screw nut assemblies are pushed out to a limit position, thereby completing a forced correction of the docking ring; then, entering step S6;

S6: the active docking device and the passive docking device are pulled closer to achieve accurate alignment; and S7: a rigid connection and sealing are completed.

* * * * *